US011409838B2

(12) United States Patent
Nair et al.

(10) Patent No.: US 11,409,838 B2
(45) Date of Patent: Aug. 9, 2022

(54) HIGH THROUGHPUT MATRIX PROCESSOR WITH SUPPORT FOR CONCURRENTLY PROCESSING MULTIPLE MATRICES

(71) Applicant: Meta Platforms, Inc., Menlo Park, CA (US)

(72) Inventors: Krishnakumar Narayanan Nair, Newark, CA (US); Olivia Wu, Los Altos, CA (US); Ehsan Khish Ardestani Zadeh, San Jose, CA (US); Abdulkadir Utku Diril, Menlo Park, CA (US); Thomas Mark Ulrich, Mountain View, CA (US); Yuchen Hao, Fremont, CA (US); Rakesh Komuravelli, Fremont, CA (US); Aravind Kalaiah, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 199 days.

(21) Appl. No.: 16/667,791

(22) Filed: Oct. 29, 2019

(65) Prior Publication Data

US 2021/0124794 A1   Apr. 29, 2021

(51) Int. Cl.
*G06F 17/16* (2006.01)
*G06F 7/544* (2006.01)
*G06F 17/15* (2006.01)

(52) U.S. Cl.
CPC ............ *G06F 17/16* (2013.01); *G06F 7/5443* (2013.01); *G06F 17/153* (2013.01)

(58) Field of Classification Search
CPC ....... G06F 17/153; G06F 17/16; G06F 7/5443
See application file for complete search history.

(56) References Cited

U.S. PATENT DOCUMENTS

| 2018/0046900 | A1* | 2/2018 | Dally ................... G06N 3/0427 |
| 2018/0189640 | A1 | 7/2018 | Henry |
| 2018/0225116 | A1* | 8/2018 | Henry ................. G06F 9/30076 |
| 2018/0336163 | A1 | 11/2018 | Phelps |
| 2019/0026078 | A1 | 1/2019 | Bannon |
| 2019/0236049 | A1 | 8/2019 | Vantrease |

FOREIGN PATENT DOCUMENTS

EP        3518176        7/2019

OTHER PUBLICATIONS

Extended European Search Report for European Application No. 20199591.7, dated Mar. 26, 2021, 09 Pages.

\* cited by examiner

*Primary Examiner* — Michael D. Yaary
(74) *Attorney, Agent, or Firm* — Van Pelt, Yi & James LLP

(57) ABSTRACT

A system comprises a data input vector unit, a weight input vector unit, and a plurality of calculation units of a matrix processor unit. The data input vector unit is configured to concurrently receive elements of different rows of a first and second data matrix. The weight input vector unit is configured to receive a combined weight vector and at least in part concurrently provide obtained weight elements of a first and second weight matrix to a corresponding first and second group of calculation units. Each calculation unit of the first and second group of calculation units is configured to multiply elements from the data input vector unit with elements of the corresponding weight matrix from the weight input vector unit and sum together multiplication results of the corresponding calculation unit to at least in part determine a corresponding element in a first or second convolution result matrix.

20 Claims, 18 Drawing Sheets

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 802 | | | | | | | | | | | | | | | | |
| 804 | $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | 0 | 0 |
| 806 | $X_{3,7}$ | $X_{3,8}$ | $X_{3,9}$ | $X_{3,10}$ | $X_{4,1}$ | $X_{4,2}$ | $X_{4,3}$ | $X_{4,4}$ | $X_{4,5}$ | $X_{4,6}$ | $X_{4,7}$ | $X_{4,8}$ | $X_{4,9}$ | $X_{4,10}$ | 0 | 0 |
| 808 | $X_{4,7}$ | $X_{4,8}$ | $X_{4,9}$ | $X_{4,10}$ | $X_{5,1}$ | $X_{5,2}$ | $X_{5,3}$ | $X_{5,4}$ | $X_{5,5}$ | $X_{5,6}$ | $X_{5,7}$ | $X_{5,8}$ | $X_{5,9}$ | $X_{5,10}$ | 0 | 0 |
| 810 | $X_{5,7}$ | $X_{5,8}$ | $X_{5,9}$ | $X_{5,10}$ | $X_{6,1}$ | $X_{6,2}$ | $X_{6,3}$ | $X_{6,4}$ | $X_{6,5}$ | $X_{6,6}$ | $X_{6,7}$ | $X_{6,8}$ | $X_{6,9}$ | $X_{6,10}$ | 0 | 0 |
| 812 | $X_{6,7}$ | $X_{6,8}$ | $X_{6,9}$ | $X_{6,10}$ | $X_{7,1}$ | $X_{7,2}$ | $X_{7,3}$ | $X_{7,4}$ | $X_{7,5}$ | $X_{7,6}$ | $X_{7,7}$ | $X_{7,8}$ | $X_{7,9}$ | $X_{7,10}$ | 0 | 0 |
| 814 | $X_{7,7}$ | $X_{7,8}$ | $X_{7,9}$ | $X_{7,10}$ | $X_{8,1}$ | $X_{8,2}$ | $X_{8,3}$ | $X_{8,4}$ | $X_{8,5}$ | $X_{8,6}$ | $X_{8,7}$ | $X_{8,8}$ | $X_{8,9}$ | $X_{8,10}$ | 0 | 0 |
| 816 | $X_{17,7}$ | $X_{17,8}$ | $X_{17,9}$ | $X_{17,10}$ | $X_{18,1}$ | $X_{18,2}$ | $X_{18,3}$ | $X_{18,4}$ | $X_{18,5}$ | $X_{18,6}$ | $X_{18,7}$ | $X_{18,8}$ | $X_{18,9}$ | $X_{18,10}$ | 0 | 0 |

FIG. 8B

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 901 | 0 | | | | | | | | | | | | | | | |
| 903 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 | 0 | 0 |
| 905 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 | 0 |
| 907 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ | 0 |
| 909 | 0 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ | $W_{2,3}$ |
| 911 | 0 | 0 | 0 | 0 | $W_{1,1}$ | $W_{1,2}$ | $W_{1,3}$ | 0 | 0 | 0 | 0 | 0 | 0 | 0 | $W_{2,1}$ | $W_{2,2}$ |
| 913 | 0 | 0 | 0 | 0 | 0 | $W_{1,1}$ | $W_{1,2}$ | $W_{1,3}$ | 0 | 0 | 0 | 0 | 0 | 0 | 0 | $W_{2,1}$ |
| 915 | 0 | 0 | 0 | 0 | 0 | 0 | $W_{1,1}$ | $W_{1,2}$ | $W_{1,3}$ | 0 | 0 | 0 | 0 | 0 | 0 | 0 |
| 917 | 0 | 0 | 0 | 0 | 0 | 0 | 0 | $W_{1,1}$ | $W_{1,2}$ | $W_{1,3}$ | 0 | 0 | 0 | 0 | 0 | 0 |

FIG. 9A

| | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| 902 | 0 | 0 | 0 | 0 | 0 | 0 | 0 | 0 | 0 | 0 | 0 | 0 | 0 | 0 | 0 | 0 |
| 904 | 0 | 0 | 0 | 0 | $W_{3,1}$ | $W_{3,2}$ | $W_{3,3}$ | 0 | 0 | 0 | 0 | 0 | 0 | 0 | 0 | 0 |
| 906 | 0 | 0 | 0 | 0 | 0 | $W_{3,1}$ | $W_{3,2}$ | $W_{3,3}$ | 0 | 0 | 0 | 0 | 0 | 0 | 0 | 0 |
| 908 | 0 | 0 | 0 | 0 | 0 | 0 | $W_{3,1}$ | $W_{3,2}$ | $W_{3,3}$ | 0 | 0 | 0 | 0 | 0 | 0 | 0 |
| 910 | 0 | 0 | 0 | 0 | 0 | 0 | 0 | $W_{3,1}$ | $W_{3,2}$ | $W_{3,3}$ | 0 | 0 | 0 | 0 | 0 | 0 |
| 912 | $W_{2,3}$ | 0 | 0 | 0 | 0 | 0 | 0 | 0 | $W_{3,1}$ | $W_{3,2}$ | $W_{3,3}$ | 0 | 0 | 0 | 0 | 0 |
| 914 | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 | 0 | 0 |
| 916 | $W_{2,1}$ | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 | 0 |
| 918 | 0 | $W_{2,1}$ | $W_{2,2}$ | $W_{2,3}$ | 0 | 0 | 0 | 0 | 0 | 0 | 0 | $W_{3,1}$ | $W_{3,2}$ | $W_{3,3}$ | 0 | 0 |

FIG. 9B

| 1001 | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1003 | | $W_{1,1}$ | $W_{1,2}$ | $W_{1,3}$ | 0 | 0 | 0 | 0 | 0 | 0 | $W_{2,1}$ | $W_{2,2}$ | $W_{2,3}$ | 0 | 0 | 0 |
| 1005 | | $X_{1,1}$ | $X_{1,2}$ | $X_{1,3}$ | $X_{1,4}$ | $X_{1,5}$ | $X_{1,6}$ | $X_{1,7}$ | $X_{1,8}$ | $X_{1,9}$ | $X_{1,10}$ | $X_{2,1}$ | $X_{2,2}$ | $X_{2,3}$ | $X_{2,4}$ | $X_{2,5}$ | $X_{2,6}$ |

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| 1002 | | | | | | | | | | | | | | | |
| 0 | 0 | 0 | 0 | $W_{3,1}$ | $W_{3,2}$ | $W_{3,3}$ | 0 | 0 | 0 | 0 | 0 | 0 | 0 | 0 | 0 |
| 1004 | | | | | | | | | | | | | | | |
| $X_{2,7}$ | $X_{2,8}$ | $X_{2,9}$ | $X_{2,10}$ | $X_{3,1}$ | $X_{3,2}$ | $X_{3,3}$ | $X_{3,4}$ | $X_{3,5}$ | $X_{3,6}$ | $X_{3,7}$ | $X_{3,8}$ | $X_{3,9}$ | $X_{3,10}$ | 0 | 0 |
| 1006 | | | | | | | | | | | | | | | |

HIGH THROUGHPUT MATRIX PROCESSOR WITH SUPPORT FOR CONCURRENTLY PROCESSING MULTIPLE MATRICES

BACKGROUND OF THE INVENTION

Processing neural networks to solve artificial intelligence problems is improved by using hardware solutions. These solutions can include hardware matrix multiplication units and dedicated matrix processing pipelines. The performance improvements can be significant due to the computation and data intensive nature of problems solved using neural networks. As the artificial neural networks become more complex, however, the characteristics of the neural networks can change. For example, neural networks can exist with different numbers of layers and each layer can have different dimensions. As the layers advance from the input layer to the output layer, the size of the layers can reduce resulting in reduced matrix sizes. Hardware sized to efficiently process matrix operations required by an input layer may be inefficient when used to solve a differently sized intermediate or output layer. Therefore, there exists a need for a high throughput matrix multiplication scheme compatible with matrices with reduced dimensions.

BRIEF DESCRIPTION OF THE DRAWINGS

Various embodiments of the invention are disclosed in the following detailed description and the accompanying drawings.

FIGS. 7A and 7B are diagrams illustrating example matrix operands for performing depthwise convolution.

FIGS. 8A and 8B are diagrams illustrating an example of an unrolled data matrix for performing depthwise convolution.

FIGS. 9A and 9B are diagrams illustrating an example of an unrolled weight matrix for performing depthwise convolution.

FIGS. 10A and 10B are diagrams illustrating an example of vector computations for performing depthwise convolution.

FIGS. 11A and 11B are diagrams illustrating an example of a combined weight vector used for performing multiple depthwise convolution operations in parallel.

DETAILED DESCRIPTION

Figure 1:
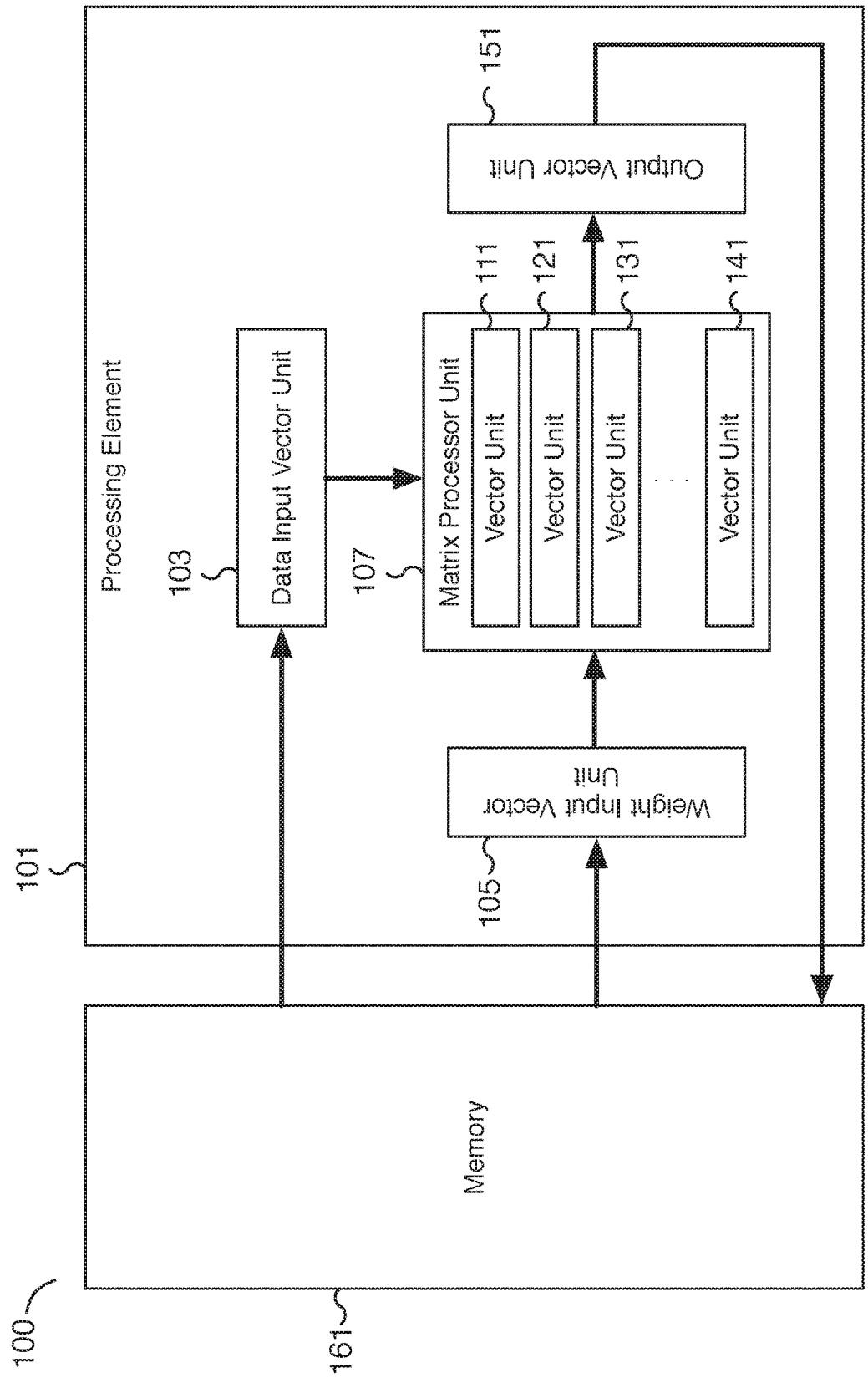
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for performing efficient convolution operations is disclosed. Using the disclosed techniques, the throughput and power efficiency for computing convolution operations and in particular depthwise convolutions is significantly increased for a range of matrix dimensions, including reduced matrix dimensions. In some embodiments, the processor system includes a matrix processor unit capable of performing matrix operations on two input matrices. The matrix processor unit includes a plurality of calculation units such as vector units used to process input vectors of the input matrices. In various embodiments, a calculation unit includes at least a vector multiply unit and a vector adder unit. The vector multiply unit is capable of performing multiply operations using corresponding elements of two input vectors. In some embodiments, the vector adder unit is used to sum the vector of multiplication results computed using a vector multiply unit. For example, the vector adder unit can be used to compute the dot product result of two vectors using the vector multiplication results of vector elements from corresponding input vectors. In some embodiments, the vector adder unit is an adder tree. For example, an adder tree computes the sum of the multiplication results by summing multiplication results and subsequent partial sums in parallel.

In various embodiments, the matrix processor unit is used to compute, in parallel, at least the partial result of multiple convolution operations such as multiple depthwise convolutions each involving two input matrices, such as a weight input and a data input matrix, by unrolling the input matrices. For example, two convolution operations are performed in parallel by assigning the vector calculation units of the matrix processor unit between the two convolution operations. A first group of vector calculation units solves the first convolution operation and a second group of vector calculation units solves the second convolution operation. A pair of weight matrices, one corresponding to each convolution operation, is read from memory and each is unrolled. For example, each weight matrix is a two-dimensional matrix that is linearized. The linearized weight matrices are stored together as a combined weight vector in memory. Once read from memory, each weight matrix is extracted from the combined weight vector and unrolled into a single row formatted as its own weight input vector. In some embodiments, the weights are extracted and converted to unrolled weight vectors by an input vector unit. As an example, two 3×3 matrices are merged and represented as 18 elements in a single combined weight vector. The elements corresponding to the weight matrix of the first convolution operation are extracted and unrolled into a single vector that may include padding, such as zero elements, between rows. Similarly, elements corresponding to the weight matrix of the second convolution operation are extracted and unrolled into another single vector that may include padding, such as zero elements, between rows. Concurrently with unrolling the weight input matrices, the corresponding data input matrices are also unrolled. In various embodiments, the corresponding data input matrices are unrolled and formatted to align the elements of the vector input data with the corresponding elements from the weight input data. The input vectors corresponding to the first convolution operation are directed to the first group of vector calculation units and the input vectors corresponding to the second convolution operation are directed to the second group of vector calculation units. Using as an example a matrix processor unit with 32 vector calculation units, 16 vector units can be allocated to solving each convolution operation. The input vectors are then processed using the matrix processor unit to compute two corresponding result sums, one for each convolution operation. In some embodiments, the two different convolution operations can correspond to different channels and are solved in parallel. For example, the different data matrices for each convolution operation may be different channels of the same three-dimensional data matrix.

In various embodiments, the elements of the unrolled weight vectors are shifted, for example, during an iteration, to compute at least a partial convolution result of each weight vector with the next column of corresponding data input elements. For example, the elements of an unrolled weight input vector may be shifted by one row element to align the weight vector elements with the corresponding next column of an unrolled data input vector. In some embodiments, the number of shifts performed during an iteration corresponds to the amount of padding between the rows of a weight input vector. For example, in the event seven zero-padded elements separate each unrolled row from a weight input matrix, after an initial set of matrix computation operations are performed, seven shifts and corresponding matrix computation operations may be performed before progressing to the next iteration. In various embodiments, the unrolled weight input vector may be broadcasted to each of the corresponding vector calculation units allocated for a particular convolution operation to compute the vector result for multiple rows in parallel. In some embodiments, multiple matrix processor units may be utilized and different matrix processor units may compute the partial sums of different iterations of the same input matrices in parallel. The partial sum results from each matrix processor unit may be combined to compute a result sum. Although described with respect to solving two convolution operations in parallel, more than two convolutions operations can be solved in parallel depending on the number of vector calculation units available. For example, three convolution operations involving 3×3 weight matrices can be solved in parallel. The three weight matrices can be merged by storing the 27 weight elements as a single combined weight vector in memory. Once read from memory, the three weight matrices can be expanded by an input vector unit into three separate unrolled weight input vectors and the available vector calculation units are allocated among the three convolution operations. In the event more than one read is necessary to read the weight matrices from memory, multiple reads can be utilized to read additional weight matrices. For example, a processing element limited to 32-element reads may require multiple reads to load four or more 3×3 weight matrices, since four weight matrices may require 36 weight elements.

In some embodiments, a system comprises a data input vector unit, a weight input vector unit, and a matrix processor unit with a plurality of calculation units. For example, a matrix processor unit contains multiple vector calculation units used to process input vectors prepared by a data input vector unit and a weight input vector unit. The plurality of calculation units of the matrix processor unit includes both a first group of one or more calculation units and a second group of one or more calculation units. Each group may be associated with a different convolution operation. The data input vector unit is configured to concurrently receive elements of a plurality of different rows of a first data matrix and a plurality of different rows of a second data matrix. For example, the matrix processor unit can process two convolution operations in parallel. A data input vector unit can prepare data input vectors corresponding to two different data matrices. The data input vector unit may read the data elements from corresponding data matrices from memory. A weight input vector unit is configured to receive a combined weight vector, wherein the combined weight vector includes weight elements of a first weight matrix and weight elements of a second weight matrix. For example, the two weight matrices are each associated with one of the two data matrices and correspond to two different convolution operations. In various embodiments, the two weight matrices are combined and stored as a combined weight vector. The weight input vector unit obtains weight elements of the first weight matrix and weight elements of the second weight matrix from the combined weight vector. For example, the first weight matrix is extracted from the combined weight vector by identifying and obtaining the corresponding weight elements for the first weight matrix from the combined weight vector. Similarly, the second weight matrix is extracted by identifying and obtaining the corresponding weight elements for the second weight matrix from the combined weight vector. In some embodiments, the weight input vector unit at least in part concurrently provides the obtained weight elements of the first weight matrix to the first group of one or more calculation units and provides the obtained weight elements of the second weight matrix to the second group of one or more calculation units. For example, the weight elements of each weight matrix are formatted into a weight input mask and broadcasted to a corresponding group of calculation units of the matrix processor unit. A first group of vector calculation units receives the formatted weight matrix for a first convolution operation and a second group of calculation units receives the formatted weight matrix for a second convolution operation. In some embodiments, each calculation unit of the first group of calculation units is configured to multiply provided elements of the first data matrix from the data input vector unit with provided corresponding elements of the first weight matrix from the weight input vector unit and sum together multiplication results of the corresponding calculation unit to at least in part determine a corresponding element in a first convolution result matrix. Similarly, each calculation unit of the second group of calculation units is configured to multiply provided elements of the second data matrix from the data input vector unit with provided corresponding elements of the second weight matrix from the weight input vector unit and sum together multiplication results of the corresponding calculation unit to at least in part determine a corresponding element in a second convolution result matrix. For example, each group of calculation units performs vector operations on the received input vectors prepared by the data input vector unit and the weight input vector unit. In some embodiments, each calculation unit includes a vector multiply unit and a vector adder unit for performing vector operations such as a dot product result. The result of each calculation unit from the first or second group of calculation units is used to determine a result or partial result of the associated convolution operation. In some embodiments, the vector output results may be used to at least in part determine a result of multiplying a weight matrix and at least a portion of the corresponding data matrix. For example, successive accumulation of vector output results may be used to determine the result of multiplying one of the weight input matrices with one of the corresponding data input matrices. In some embodiments, the vector output results may be used to at least in part determine a corresponding element in a result matrix of convoluting a data matrix with a weight matrix. For example, successive accumulation of vector output results may be used to determine the result of a depthwise convolution using a weight input matrix with a data input matrix.

FIG. 1 is a block diagram illustrating an embodiment of a system for solving artificial intelligence problems using a neural network. In the example shown, system 100 includes processing element 101 and memory 161. Processing element 101 includes data input vector unit 103, weight input vector unit 105, matrix processor unit 107, and output vector unit 151. Matrix processor unit 107 includes multiple vector calculation units including at least vector units 111, 121, 131, and 141. In various embodiments, matrix processor unit 107 receives one or more data input vectors (not shown) from data input vector unit 103 and at least one weight input vector (not shown) from weight input vector unit 105. For example, a data input vector is generated by data input vector unit 103 and a weight input vector is generated by weight input vector unit 105. The generated data input vector and weight input vector pair may be passed as arguments to a vector calculation unit, such as one of vector units 111, 121, 131, and 141, of matrix processor unit 107. For example, a vector unit of matrix processor unit 107 may determine a matrix result, such as a dot product result, using a data input vector and weight input vector pair. In some embodiments, matrix processor unit 107 includes 32 vector units. Each vector unit may take two 32-element vectors as arguments and can each produce a single element result. Taken across all vector units, the results are an output vector result. In various embodiments, the output of matrix processor unit 107 can be an output vector and is received at output vector unit 151. In some embodiments, the output vector is determined by accumulating partial vector results across multiple vector unit operations. In some embodiments, the output vector received at output vector unit 151 is a 32-element vector. Other vector lengths may be utilized as appropriate. Similarly, the size of the elements processed by system 100 can be configured as appropriate. For example, elements may be 4-bits, 8-bits, 2-byte, 4-bytes, or another appropriate size.

In various embodiments, matrix processor unit 107 is configured to receive two input matrices, each matrix a two-dimensional matrix via data input vector unit 103 and weight input vector unit 105, respectively. Data input vector unit 103, weight input vector unit 105, and output vector unit 151 may be implemented using hardware registers, such as flip-flop circuits, for transferring multiple input and output elements to/from matrix processor unit 107. In some embodiments, elements corresponding to each data input vector are retrieved from memory 161 and loaded into a corresponding vector unit, such as vector units 111, 121, 131, or 141, of matrix processor unit 107 via data input vector unit 103. For example, a matrix processor unit with 32 vector units is loaded with 32 vectors of data elements via data input vector unit 103. Correspondingly, a vector of weight elements may be loaded from memory 161 via weight input vector unit 105 and broadcasted to all the applicable vector units of matrix processor unit 107. By broadcasting the same weight input vector using unit weight input vector unit 105 to all vector units of matrix processor unit 107, the same weight values can be applied to different data vectors by the matrix processor unit and each respective vector unit. In some embodiments, data input vector unit 103, weight input vector unit 105, and/or output vector unit 151 may process more than one input/output vector simultaneously. In various embodiments, the thick arrows of FIG. 1 represent the direction data moves through the components of system 100. For example, the arrows may correspond to multi-element wide communication/data buses and/or data lines. In various embodiments, an output vector result received at output vector unit 151 can be written back to memory 161.

In various embodiments, each vector unit of matrix processor unit 107, such as vector units 111, 121, 131, or 141, receives two vector operands and can perform one or more vector operations. For example, a vector unit can compute the dot product of the two input operands and output the result as one element of an output vector to output vector unit 151. In some embodiments, the vector unit result is accumulated and used as an operand to a subsequent operation performed by the vector unit. In some embodiments, each vector unit of matrix processor unit 107, such as vector units 111, 121, 131, or 141, includes both a multiply unit and an adder unit (not shown). In some embodiments, each vector unit of matrix processor unit 107 may include a vector accumulator (not shown), for example, for storing partial results between vector operations.

In some embodiments, matrix processor unit 107 is configured to receive input data corresponding to more than two input matrices in parallel. By processing multiple pairs of matrices in parallel, the throughput and efficiency of processing element 101 and matrix processor unit 107 is significantly increased. If matrix processor unit 107 is utilized to process only a single pair of input matrices, for example, a pair of input matrices corresponding to a single depthwise convolution operation, as the input matrix sizes decrease, some vector units will remain unutilized. For example, for a matrix processor unit configured with 32 vector units, only half of the vector units (i.e., 16 vector units) are needed to process a data matrix with 18 rows. Instead, multiple convolution operations, such as multiple depthwise convolution operations, are processed in parallel. In some embodiments, the vector units of matrix processor unit 107 such as vector units 111, 121, 131, and 141 are allocated to different convolution operations. Each data input matrix of the different convolution operations is loaded as data input vectors into the corresponding vector units allocated for the particular convolution operation via data input vector unit 103. The corresponding weight input matrix for the particular convolution operation is broadcasted as a weight input vector to the same corresponding vector units via weight input vector unit 105. For example, 16 vector units of a 32 vector unit matrix processor unit can be allocated to a first convolution operation and the remaining 16 vector units of the matrix processor unit can be allocated to a second convolution operation. Each group of vector units receives data input vectors corresponding to the assigned convolution operation. Similarly, a corresponding weight input vector is broadcasted to each group of vector units based on the assigned convolution operation. In some embodiments, the different weight matrices, for example, corresponding to different convolution operations, are loaded into processing element 101 by weight input vector unit 105 via a combined weight vector (not shown). Weight input vector unit 105 reads the combined weight vector from memory 161 and expands the combined weight vector into multiple weight input vectors that are broadcasted to different groups of vector units of matrix processor unit 107.

Using the disclosed techniques, system 100 and in particular matrix processor unit 107 can be utilized to efficiently perform depthwise convolution operations for solving artificial intelligence problems using a neural network. In particular, system 100 can efficiently solve multiple depthwise convolution operations in parallel as the sizes of the data matrices decrease. Two-dimensional matrix operands may be unrolled and formatted into input vectors via data input vector unit 103 and/or weight input vector unit 105. And in some embodiments, multiple weight matrices can be read from memory 161 using a single read of a combined weight vector. Once unrolled, the input vectors can be used to implement depthwise convolution using the vector units, such as vector units 111, 121, 131, or 141, of a matrix processor unit 107. In some embodiments, an input vector unit, such as weight input vector unit 105, includes logic for efficiently shifting elements within the input vector. For example, the elements can be shifted to the right by one position. In various embodiments, the shifting logic/circuit may be configured to shift the elements right (or left) and by different numbers of positions. In some embodiments, the elements loop around when shifted past the start or end of the input vector and/or may be replaced with a default value such as a zero padding element. Weight input vector unit 105 may also include logic to expand a combined weight vector into multiple weight input vectors that can be directed to different vector units of matrix processor unit 107. Weight input vector unit 105 may include logic to format each weight input vector by inserting zero elements between rows to effectively create a weight input mask. In some embodiments, an input vector unit, such as data input vector unit 103, includes logic for efficiently retrieving data elements from memory 161 and formatting the elements in a linearized order for matrix processor unit 107. For example, data input vector unit 103 can include logic for efficiently formatting a matrix (or matrix slice) of data elements using a pattern associated with transposing the matrix (or matrix slice). Once the formatting pattern is applied, the elements can be linearized into a data input vector and passed as an operand to a vector unit of matrix processor unit 107.

Figure 2A:
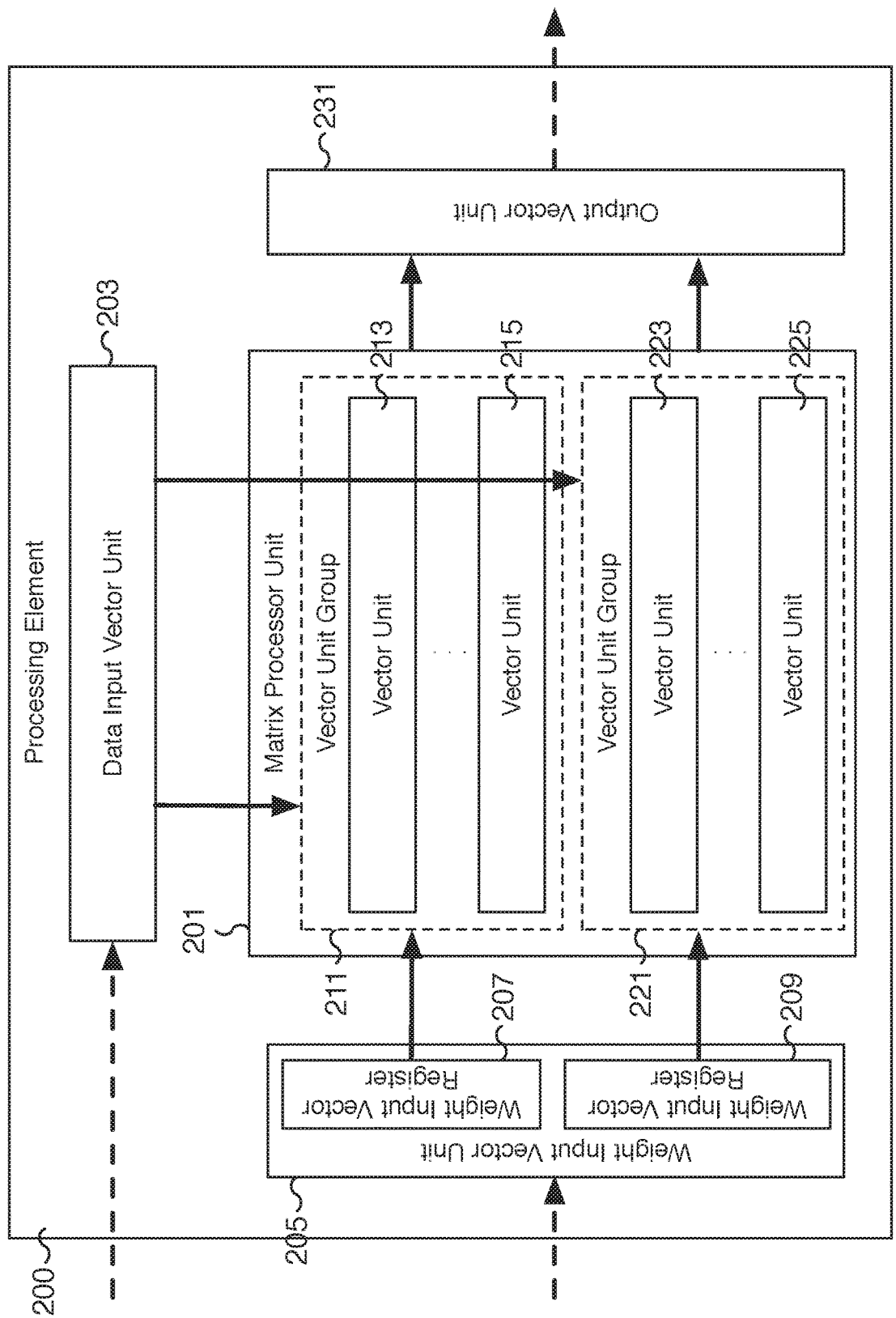
FIG. 2A is a block diagram illustrating an embodiment of a processor system for solving artificial intelligence problems using a neural network.

FIG. 2A is a block diagram illustrating an embodiment of a processor system for solving artificial intelligence problems using a neural network. In the example shown, processing element 200 includes matrix processor unit 201, data input vector unit 203, weight input vector unit 205, and output vector unit 231. Matrix processor unit 201 includes multiple vector units including at least vector units 213, 215, 223, and 225. The vector units of matrix processor unit 201 are allocated to two different vector unit groups 211 and 221. Vector unit group 211 includes vector units 213 and 215 and vector unit group 221 includes vector units 223 and 225. The three dots between vector units 213 and 215 and between vector units 223 and 225 indicate optional additional vector units (not shown) included in each group. In some embodiments, vector unit groups 211 and 221 are logical groups as indicated by the dotted rectangles. The number and the particular vector units assigned to each vector unit group can change, for example, depending on the processor workload. For example, a 32 vector unit matrix processor unit may allocate 16 vector units to one vector unit group and the remaining 16 vector units to a second vector unit group. Based on a different workload, 14 vector units may be allocated to one vector unit group, 14 vector units to a second vector unit group, and the remaining 4 vector units may be unutilized and unallocated to any vector unit group. Although the vector units in FIG. 2A are allocated among two different groups, the number of vector unit groups can exceed two. In various embodiments, each vector unit group corresponds to a convolution operation. For example, vector unit group 211 corresponds to a first convolution operation and vector unit group 221 corresponds to a second convolution operation.

In some embodiments, matrix processor unit 201 is configured to receive two input matrices, each matrix a two-dimensional matrix via data input vector unit 203 and weight input vector unit 205, respectively, and output a matrix result to output vector unit 231. Matrix processor unit 201 is also configured to receive multiple pairs of input matrices, for example, each pair of matrices corresponding to a different matrix or convolution operation, and output the matrix result (or partial result) of each operation to output vector unit 231. In the example shown, matrix processor unit 201, data input vector unit 203, and weight input vector unit 205 are configured to receive up to two pairs of input matrices. Data input vector unit 203 directs data input vectors processed for different convolution operations to the corresponding vector units of vector unit group 211 or 221. Weight input vector unit 205 processes a combined weight vector to create a weight input vector for each convolution operation. The created weight input vectors are stored in weight input vector registers 207 and 209. A first weight input vector is stored in weight input vector register 207 and a second weight input vector is stored in weight input vector register 209. The weight input vector of weight input vector register 207 is broadcasted to the vector units of vector unit group 211, including vector units 213 and 215. Similarly, the weight input vector of weight input vector register 209 is broadcasted to the vector units of vector unit group 221, including vector units 223 and 225. The same vector units receive corresponding data input vectors from data input vector unit 203. In various embodiments, the result or partial result of vector unit group 211 or vector unit group 221 can be outputted independently to output vector unit 231. In some embodiments, output vector unit 231 may include multiple output buffers or registers to receive multiple output results.

In the example shown, the solid arrows of FIG. 2A indicate logical connectivity. For example, the connection between weight input vector register 207 to vector unit group 211 and between weight input vector register 209 to vector unit group 221 may be implemented using a shared bus and logic. Similarly, the connection between data input vector unit 203 to vector unit group 211 and between data input vector unit 203 to vector unit group 221 may be implemented using a shared bus and logic. Although processing element 200 is configured for processing two matrix pairs in parallel, a processing element can be configured to process additional matrix pairs as appropriate. For example, in some embodiments, a processing element is configured for processing three or more matrix pairs in parallel. A weight input vector unit generates corresponding weight input vectors for each matrix pair and a data input vector unit generates the corresponding data input vectors. The vector units are allocated into vector unit groups based on the number of simultaneous matrix operations and matrix pairs. The corresponding input vectors of each matrix pair are directed to the assigned vector units.

In some embodiments, processing element 200 is processing element 101 of FIG. 1 and matrix processor unit 201, data input vector unit 203, weight input vector unit 205, and output vector unit 231 are matrix processor unit 107, data input vector unit 103, weight input vector unit 105, and output vector unit 151, respectively, of FIG. 1. In some embodiments, vector units 213, 215, 223, and 225 are each one of vector units 111, 121, 131, or 141 of FIG. 1. In some embodiments, processing elements, such as processing element 200, and multiple matrix processor units, such as matrix processor unit 201, may be utilized in parallel for increased performance. For example, one processing element and its matrix processor unit can be used to process one slice of a large matrix and another processing element and its matrix processor unit can be used to process a separate slice of the same matrix.

In some embodiments, data input vector unit 203 is used to load a vector operand into matrix processor unit 201. For example, data corresponding to at least a portion of a two-dimensional matrix can be read from memory and processed by data input vector unit 203 before being loaded into matrix processor unit 201. In various embodiments, the data input vector operand generated by data input vector unit 203 may be directed to any one of the vector units of matrix processor unit 201, such as vector unit 213, 215, 223, or 225. For example, in some embodiments, matrix processor unit 201 includes 32 vector units. Over 32 cycles, 32 vector operands can be loaded into matrix processor unit 201 via data input vector unit 203. For each cycle, one data input vector operand is generated by data input vector unit 203 and then loaded into one of the 32 vector units. After 32 cycles, all 32 vector units have received a data input vector operand. In some embodiments, multiple data input vectors can be generated and loaded each cycle. For example, four data input vectors can be generated in parallel to load 32 vector units in 8 cycles. In some embodiments, the data input vectors that are loaded may be sourced from different data matrices corresponding to different convolution operations. For example, data input vectors for a first convolution operation may be read from a first data input matrix and directed to vector units of vector unit group 211. Data input vectors for a second convolution operation may be read from a second data input matrix and directed to vector units of vector unit group 221.

Similarly, weight input vector unit 205 is used to load a second vector operand for each applicable vector unit of matrix processor unit 201. For example, weight data corresponding to at least a portion of a two-dimensional weight matrix can be read from memory and processed by weight input vector unit 205 before being loaded into matrix processor unit 201. In various embodiments, the weight input vector operand generated by weight input vector unit 205 may be directed to any one, a group, or all of the vector units of matrix processor unit 201, such as vector unit 213, 215, 223, or 225 or vector unit groups 211 or 221. For example, the same weight input vector operand can be broadcasted to all vector units of matrix processor unit 201. This allows the same weight data to be applied to each data input vector operand. Similarly, the same weight input vector operand can be broadcasted to all vector units of a vector unit group. This allows the same weight data to be applied to each data input vector operand corresponding to the matrix operation assigned to the group.

In some embodiments, multiple weight input vectors are generated from a combined weight vector. For example, a pair of two-dimensional weight matrices are stored in a single vector and can be read from memory in a single memory read. Weight input vector unit 205 extracts the weights for each weight matrix from the combined weight vector and creates two weight input vectors, one corresponding to each weight matrix. The weight input vectors may be stored independently in different weight input vector registers 207 and 209 before being broadcasted to their respective vector unit groups. For example, a first vector unit group 211 is assigned to a first convolution operation and a second vector unit group 221 is assigned to a second convolution operation. Each weight input vector is broadcasted to the vector units of the appropriate vector unit group. This allows two convolution operations to be solved in parallel and significantly increases the utilization of the vector units when the matrix sizes are reduced. In various embodiments, three or more convolution operations corresponding to three or more weight matrices may be processed in parallel. For example, a combined vector unit may include three linearized weight matrices. In some embodiments, multiple reads may be required to load multiple weight matrices. In some embodiments, data input vector unit 203 can be used to similarly broadcast a vector operand to multiple vector units.

In some embodiments, the number of cycles required to load a vector operand from memory via data input vector unit 203 and/or weight input vector unit 205 into matrix processor unit 201 is based on the utilization of the matrix processor unit. For example, to keep the matrix processor near full utilization, data arguments for the vector units are retrieved from memory and prepared over a time period (e.g., a certain number of cycles) that closely matches the compute utilization of the vector units. By matching the load and compute times, the matrix processor can be kept near full utilization. In some embodiments, data read times are reduced, for example, by increasing the bus speed, to better match the load and compute times. For example, in various embodiments, matrix processor unit 201 may take approximately eight clock cycles to complete a certain set of computations. (An example of a set of computations might include applying eight different weight input vectors to a set of data input vectors.) A read rate of one vector operand per cycle would require at least 32 cycles to load all vector units. Increasing the read rate by a factor of four allows all 32 vector operands to be loaded in approximately 8 cycles, matching the processing compute time of the matrix processor unit. In various embodiments, by matching the data read speed, for example, the data bus speed used to load vector operands, with matrix processor unit compute performance and workload, the overall efficiency and throughput of the matrix processor unit is significantly increased. In some embodiments, the data read speed is at least in part increased using the techniques disclosed herein. For example, multiple data input vectors may be generated in parallel to multiply to overall effective data read speed. In some embodiments, data input vector unit 203 may process multiple data input vectors in parallel to reduce the number of cycles required to load a corresponding data input vector to all of the vector units of matrix processor unit 201. Similarly, weight input vector unit 205 may process multiple weight input vectors in parallel to reduce the number of cycles required to load a corresponding weight input vector to a group of vector units of matrix processor unit 201.

In some embodiments, data input vector unit 203 and/or weight input vector unit 205 includes shifting hardware (not shown) to shift the elements of the vector operands. For example, weight input vector unit 205 can be loaded with one or more vector operands that are used for a first iteration. During a second iteration, the vector operands can be shifted by one or more positions (to the right or left) as appropriate. The newly shifted vector operands can be used for matrix computations. Once the matrix computations are completed, the vector operands can be shifted again and the newly shifted vector operands can be used for the next iteration. In this manner, the new vector operands (determined by shifting the contents of the input vector) are applied during each iteration and may be stored or shifted in place in a weight input vector register such as weight input vector registers 207 and 209. For example, in some embodiments, the shifting logic is utilized on an unrolled matrix operand, such as an unrolled weight matrix, to align the unrolled matrix operand with appropriate elements from a second matrix operand, such as an unrolled data matrix.

In some embodiments, matrix processor unit 201 includes multiple vector units that each include a vector multiply and vector adder unit. Each vector multiply unit is configured to multiply corresponding elements received via data input vector unit 203 and weight input vector unit 205. In some embodiments, the result is a vector of multiplication results. For example, for two 32-byte input vectors, the result of a vector multiply unit is a vector of 32 multiplication results. For each vector unit, the first element of a data input vector from data input vector unit 203 is multiplied with the first element of a weight input vector from weight input vector unit 205. Similarly, the second element of a data input vector is multiplied with the second element of a weight input vector. In various embodiments, corresponding elements from a data input vector generated by data input vector unit 203 and a weight input vector generated by weight input vector unit 205 are multiplied in parallel. In various embodiments, the vector of multiplication results is passed to a vector adder unit of the vector unit.

In some embodiments, each vector adder unit is configured to compute the sum of the elements from an input vector. For example, the sum of each of the elements from a vector of multiplication results computed by a vector multiply unit is computed by a vector adder unit. In some embodiments, the result of a vector adder unit is a dot product of the vectors used as input to the corresponding vector multiply unit. In various embodiments, each vector adder unit is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple dot products in parallel, significantly improving the throughput of matrix and convolution operations.

In some embodiments, matrix processor unit 201 includes one or more accumulators, for example, to accumulate the results of each vector unit. In some embodiments, an accumulator is included as part of a vector unit or as part of matrix processor unit 201 as appropriate. The accumulator(s) can be used to sum the results computed across multiple iterations of the vector units. For example, the final result sum of one iteration of a vector unit can be stored in an accumulator and added to the final result sum of the next iteration of the vector unit. In some embodiments, the accumulator is a vector accumulator. For example, the accumulator may be sized based on the size of the output vector received by output vector unit 231. In various embodiments, once matrix processing is complete, the accumulator results may be pushed to output vector unit 231. In some embodiments, an accumulator exists for each vector unit group.

Figure 2B:
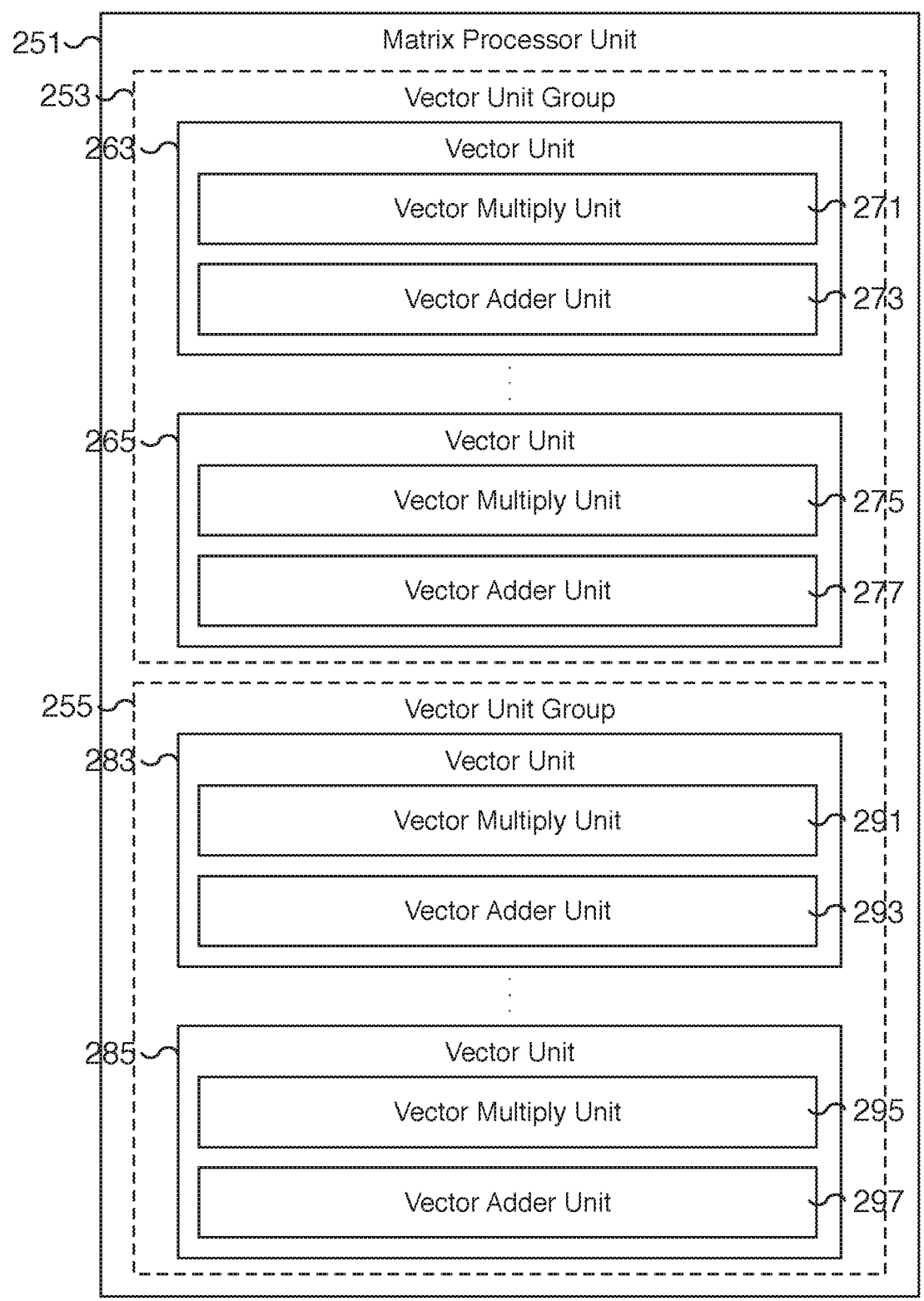
FIG. 2B is a block diagram illustrating an embodiment of a matrix processor unit for solving artificial intelligence problems using a neural network.

FIG. 2B is a block diagram illustrating an embodiment of a matrix processor unit for solving artificial intelligence problems using a neural network. In the example shown, matrix processor unit 251 includes multiple vector unit groups including vector unit groups 253 and 255. Each vector unit group includes multiple vector units. The vector units 263, 265, 283, and 285 of matrix processor unit 251 are allocated to two different vector unit groups 253 and 255. Vector unit group 253 includes vector units 263 and 265. Vector unit group 255 includes vector units 283 and 285. The three dots between vector units 263 and 265 and between vector units 283 and 285 indicate optional additional vector units (not shown) included in each group. In some embodiments, vector unit groups 253 and 255 are logical groups as indicated by the dotted rectangles. The number and the particular vector units assigned to each vector unit group can change, for example, depending on the processor workload. In various embodiments, a matrix processor unit may include more or fewer vector units. For example, a matrix processor unit may include 32 vector units, each capable of processing two 32-element vectors. In some embodiments, each vector unit includes a vector multiply unit and a vector adder unit. In the example shown, vector unit 263 includes vector multiply unit 271 and vector adder unit 273. Similarly, vector unit 265 includes vector multiply unit 275 and vector adder unit 277, vector unit 283 includes vector multiply unit 291 and vector adder unit 293, and vector unit 285 includes vector multiply unit 295 and vector adder unit 297. In various embodiments, matrix processor unit 251 is matrix processor unit 201 of FIG. 2A, vector unit groups 253 and 255 are vector unit groups 211 and 221 of FIG. 2A, respectively, and vector units 263, 265, 283, and 285 are vector units 213, 215, 223, and 225 of FIG. 2A, respectively.

In some embodiments, each vector unit of matrix processor unit 251, such as vector units 263, 265, 283, and 285, receives two vector operands and can perform one or more vector operations. For example, a vector unit can compute the result of multiple multiply operations by multiplying each element of the first input vector with a corresponding element of a second input vector. The resulting multiplication results can be accumulated and used for future operations, such as summing partial results. For example, a vector unit result can be accumulated and used as an operand to a subsequent operation performed by the vector unit. In various embodiments, the vector units of each vector unit group receive vector operands associated with the same matrix operation, such as a depthwise convolution operation. For example, vector units of vector unit group 253, such as vector units 263 and 265, receive vector operands associated with a first convolution operation and vector units of vector unit group 255, such as vector units 283 and 285, receive vector operands associated with a second convolution operation. The vector units of each group may be configured to receive the same weight input vector (e.g., via a broadcast) but may receive different data input vectors corresponding to different elements of the same data matrix associated with the group. This allows the same weight matrix to be applied to different portions of the same data matrix while also processing multiple weight and data matrices.

In the example shown, matrix processor unit 251 includes multiple vector units that each include a vector multiply and a vector adder unit. Each vector multiply unit, such as vector multiply units 271, 275, 291, or 295, is configured to multiply corresponding elements received via a data input vector unit (not shown) and a weight input vector unit (not shown). In some embodiments, the result is a vector of multiplication results. For example, for two 32-byte input vectors, the result of a vector multiply unit is a vector of 32 multiplication results. The first element from a data input vector is multiplied with the first element of a weight input vector. Similarly, the second element from a data input vector is multiplied with the second element of a weight input vector. In various embodiments, corresponding elements from a data input vector and a weight input vector are multiplied in parallel. In various embodiments, the vector of multiplication results is passed to a vector adder unit of the vector unit. For example, vector multiply unit 271 passes its multiplication results to vector adder unit 273, vector multiply unit 275 passes its multiplication results to vector adder unit 277, vector multiply unit 291 passes its multiplication results to vector adder unit 293, and vector multiply unit 295 passes its multiplication results to vector adder unit 297.

In some embodiments, each vector adder unit of a vector unit, such as vector adder unit 273, 277, 293, or 297, is configured to compute addition operations using elements from an input vector. For example, the sum of selected elements from a vector of multiplication results computed by vector multiply unit 271 is computed by vector adder unit 273. Similarly, the sum of each of the elements from a vector of multiplication results computed by vector multiply unit 275 is computed by vector adder unit 277, the sum of each of the elements from a vector of multiplication results computed by vector multiply unit 291 is computed by vector adder unit 293, and the sum of each of the elements from a vector of multiplication results computed by vector multiply unit 295 is computed by vector adder unit 297. In some embodiments, the result of a vector adder unit is a dot product of the vectors used as input to the corresponding vector multiply unit. In various embodiments, each vector adder unit, such as vector adder unit 273, 277, 293, or 297, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In some embodiments, any partial sums may be outputted as a result of the adder unit. In various embodiments, each adder tree computes partial sums in parallel to arrive at a result sum. The parallel operation significantly improves the efficiency of summing a vector of numbers. In various embodiments, multiple vector units can operate in parallel to compute multiple results in parallel, significantly improving the throughput of matrix processor unit 251.

In some embodiments, matrix processor unit 251 includes one or more accumulators (not shown), for example, to accumulate the results of each vector unit. In some embodiments, an accumulator is included as part of a vector unit or as part of matrix processor unit 251 as appropriate. The accumulator(s) can be used to sum the results computed across multiple iterations of the vector units. For example, the result from one iteration of a vector unit can be stored in an accumulator and added to the result of the next iteration of the vector unit. In some embodiments, the accumulator is a vector accumulator. For example, the accumulator may be sized based on the size of an output vector of matrix processor unit 251. In various embodiments, once matrix processing is complete, the accumulator results may be pushed to memory. In some embodiments, matrix processor unit 251 may be configured with multiple vector accumulators to accumulate an output result associated with each vector unit group.

Figure 3:
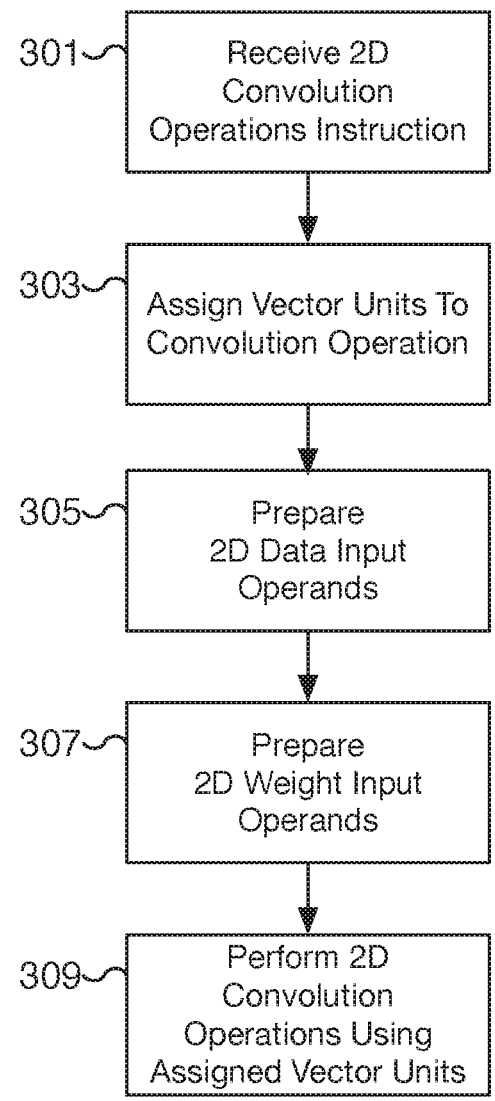
FIG. 3 is a flow chart illustrating an embodiment of a process for performing multiple two-dimensional convolution operations in parallel using a matrix processor unit.

FIG. 3 is a flow chart illustrating an embodiment of a process for performing multiple two-dimensional convolution operations in parallel using a matrix processor unit. For example, an artificial intelligence problem is solved using a neural network in part by analyzing one or more layers of a neural network by solving one or more two-dimensional convolution operations. The appropriate two-dimensional convolution operations may be initiated by issuing one or more two-dimensional convolution operation instructions to one or more matrix processor units. Each instruction may indicate two or more pairs of operand matrices, for example, by specifying the location of each matrix operand in memory, in a register, or in another appropriate location. In some embodiments, the instruction corresponds to multiple depthwise convolution operations using a data (or activation) matrix and a weight matrix for each depthwise convolution. In some embodiments, the convolution operations are performed using processing element 101 of FIG. 1 and/or processing element 200 of FIG. 2A and in particular using a matrix processor such as matrix processor unit 107 of FIG. 1, matrix processor unit 201 of FIG. 2A, and/or matrix processor unit 251 of FIG. 2B.

At 301, an instruction describing two-dimensional convolution operations is received. For example, an instruction is received by a processor element such as a processor element that includes a matrix processor unit, input vector registers, and/or an output vector register, among other components. In various embodiments, the processor element may include additional or fewer components in addition to the matrix processor unit. The received two-dimensional convolution operations instruction directs the processor element to perform multiple two-dimensional convolution operations and can specify two matrix operands for each convolution operation. For example, a first pair of matrices may be a two-dimensional data matrix and a two-dimensional weight matrix for a first convolution operation and a second pair of matrices may be a different two-dimensional data matrix and a different two-dimensional weight matrix for a second convolution operation. In some embodiments, multiple weight matrices are referenced as a single operand. For example, two or more matrices can be referenced as a combined weight vector stored in memory. In some embodiments, the matrix operands may be too large for loading into the matrix processor unit without first splitting one or more of the matrix operands into smaller matrix slices. In some embodiments, the different convolution operations are specified using multiple instructions but are solved in parallel.

At 303, vector units are assigned to each convolution operation. For example, a first group of vector units is assigned to a first convolution operation and a second group of vector units is assigned to a second convolution operation. In some embodiments, the number of vector units to assign for a specific convolution operation is determined by one or more instructions received at 301. For example, the instruction may specify the number of vector units to assign to a convolution operation and/or one or more dimensions of a matrix argument. The size of the matrix operands may further dictate the number of vector units to assign. For example, in some embodiments, the number of vector units required for a matrix with N rows is N+2 vector units when three rows of a matrix are unrolled into a single input vector. By unrolling three rows into a single input vector, a data matrix with 18 rows can utilize at most 16 vector units.

At 305, two-dimensional data input operands are prepared. For example, a two-dimensional data matrix is prepared as an operand for each convolution operation. In some embodiments, data corresponding to each two-dimensional data input operand is retrieved from memory or another location. The retrieved data may be certain rows and/or columns of a data input operand. For example, different slices of a data input operand may be prepared separately and/or may be prepared in parallel by different processing elements. In various embodiments, the preparation may include unrolling portions of the two-dimensional data input operand. For example, the specified portions of a data input matrix may be linearized into a vector. In some embodiments, only a portion of the matrix or matrix slice is linearized, for example, only a subset of the rows. In unrolling and linearizing the selected portions of a data matrix, the rows may be separated by padding elements, such as zero elements, to at least in part align the selected matrix elements with corresponding elements from a weight input operand. In various embodiments, each prepared data input operand is loaded into a vector unit of a matrix processor unit. Depending on the input operand, additional portions of the corresponding matrix are unrolled, linearized, and loaded into the matrix processor unit. For example, a vector corresponding to a different (and possibly overlapping) portion of a two-dimensional data input operand is unrolled, linearized, and loaded into a different vector unit of the matrix processor unit. In some embodiments, the prepared data input operands are loaded using a data input vector unit such as data input vector unit 103 of FIG. 1 and/or data input vector unit 203 of FIG. 2A.

At 307, two-dimensional weight input operands are prepared. For example, a two-dimensional weight matrix is prepared as a second operand for each convolution operation. In some embodiments, data corresponding to each two-dimensional weight input operand is retrieved from memory or another location. In some embodiments, the data for multiple weight input operands is retrieved together as a combined weight vector. The retrieved weight data may be certain rows and/or columns of the weight input operand. For example, different slices of the weight input operand may be prepared separately and/or may be prepared in parallel by different processing elements. In various embodiments, the preparation may include unrolling portions of a two-dimensional weight input operand. For example, the specified portions of a weight input matrix may be linearized into a vector. In some embodiments, only a portion of the matrix or matrix slice is linearized, for example, only a subset of the rows. In unrolling and linearizing the selected portions of a matrix, the rows may be separated by padding elements, such as zero elements, to at least in part align the selected matrix elements with corresponding elements from a data input operand. The number of padding elements may vary at least in part based on data sizes supported by the matrix processor unit and the dimensions of the weight input matrix. In various embodiments, the prepared weight input operand is loaded into a vector unit of a matrix processor unit. In some embodiments, the prepared weight input operand is broadcasted and loaded into more than one vector unit of the matrix processor unit. For example, the same weight input operand can be broadcasted to every vector unit of the matrix processor unit or every vector unit of a vector unit group of the matrix processor unit assigned to the associated convolution operation. In some embodiments, the prepared weight input operand is loaded using a weight input vector unit such as weight input vector unit 105 of FIG. 1 and/or weight input vector unit 205 of FIG. 2A. In some embodiments, a weight input vector unit extracts the elements of each weight matrix from a combined weight vector to prepare each weight input operand for each convolution operation specified at 301.

At 309, two-dimensional convolution operations are performed. Using the data input operands and the weight input operands prepared at 305 and 307, respectively, two-dimensional convolution operations are performed by a matrix processor unit. The convolution operations may include computing partial and/or intermediate results that are accumulated across different iterations. In various embodiments, the matrix processor unit provides a vector of output results as an output vector. In some embodiments, each vector unit group computes the results or partial results of a corresponding convolution operation in parallel with other vector unit groups. In some embodiments, the output vectors are received by an output vector unit such as output vector unit 151 of FIG. 1 and/or output vector unit 231 of FIG. 2A. In some embodiments, a complete two-dimensional convolution operation may involve shifting the elements of the weight input operand to at least in part compute the depthwise convolution of the weight input matrix with different portions of the data input matrix.

Figure 4:
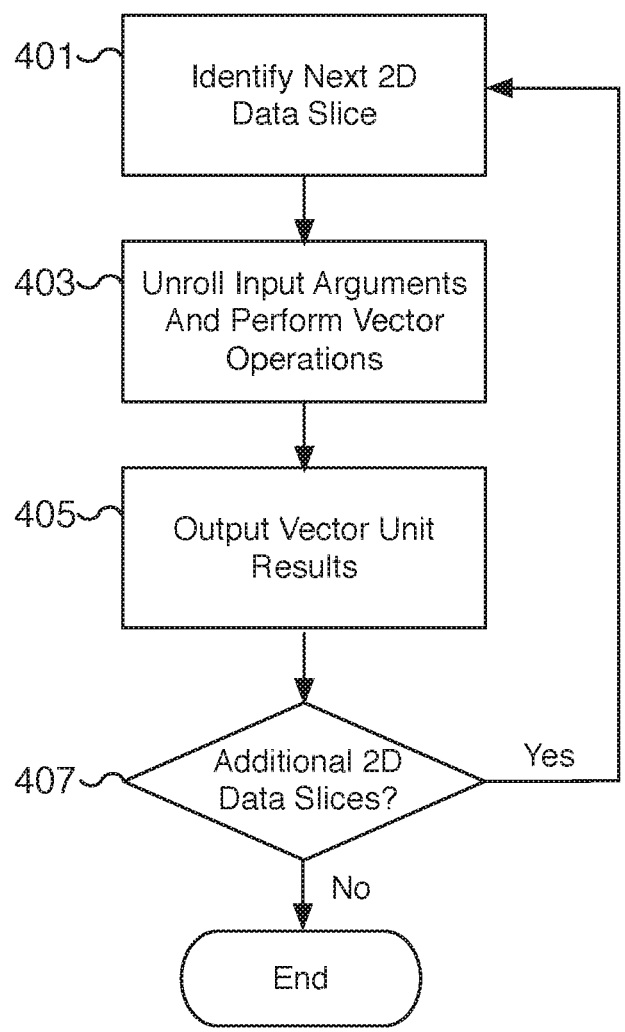
FIG. 4 is a flow chart illustrating an embodiment of a process for performing a two-dimensional convolution operation using a matrix processor unit.

FIG. 4 is a flow chart illustrating an embodiment of a process for performing a two-dimensional convolution operation using a matrix processor unit. For example, the result of a two-dimensional convolution operation is computed by performing multiple vector operations on two-dimensional slices of matrix arguments. One or more input arguments, such as a data input matrix, may exceed the maximum operand size of a matrix processor unit. As a result, an input operand may be sliced into smaller matrices compatible with the operand size of a matrix processor unit. The compatible-sized slices can be passed as operands to one or more different matrix processor units and the results combined. In some embodiments, the slices are operated on different matrix processor units, for example, matrix processor units corresponding to different processor elements. In some scenarios, the input arguments for a two-dimensional convolution operation are small enough that solving the convolution operation does not fully utilize a matrix processor unit. As a result, the matrix processor unit can allocate processing among different convolution operations. For example, vector units of a matrix processor unit can be assigned to different vector unit groups and each group can process a different convolution operation allowing multiple convolution operations to be solved in parallel.

In various embodiments, the process of FIG. 4 may be performed in response to a convolution operations instruction such as the convolution operations instruction received at 301 of FIG. 3. In some embodiments, the process of FIG. 4 is performed at 305, 307, and/or 309 of FIG. 3 utilizing the vector units assigned to the convolution operation at 303 of FIG. 3. In some embodiments, the process of FIG. 4 is performed using matrix processor unit 107 of FIG. 1 and/or matrix processor unit 201 of FIG. 2A.

At 401, the next two-dimensional slice of a matrix operand is identified. For example, one or more matrix operands with sizes compatible with the operand size of a matrix processor unit are identified. The slices may be identified in memory and a read request may be issued to load the identified data. In some embodiments, it may be common for the size of the data input matrix to be extremely large compared to the size of the weight input matrix. The data input matrix is sliced into smaller sizes for processing. In some embodiments, the data input matrix is sliced into slices based on the number of vector units allocated to the convolution operation. At 401, the next slice is identified for processing.

At 403, the input arguments are unrolled and vector operations are performed. For example, a slice of a data input matrix and a weight input matrix are unrolled. In various embodiments, the unrolling linearizes a two-dimensional matrix (or matrix slice) into a vector operand that is loaded into at least one vector unit of a matrix processor unit. The unrolling may require more than one iteration. For example, in some embodiments, the unrolled matrix operand is unrolled over several iterations such that only a subset of rows is unrolled for each iteration. For example, for larger weight matrices, the weight matrix cannot be unrolled to fit in its entirety in a vector unit. Multiple iterations are utilized until the entire matrix is unrolled. In various embodiments, the weight matrix may be unrolled into a vector operand and broadcasted to more than one vector unit of the matrix processor unit. In some embodiments, each iteration may further include shifting the unrolled weight matrix to apply the elements of the weight matrix to different columns of the unrolled data matrix. In various embodiments, intermediate results may be accumulated and used as arguments for subsequent iterations. The vector operations performed can include a vector multiply and a vector add. For example, a dot product operation can be performed on vector data and weight arguments by each vector unit of a matrix processor unit to compute at least a portion of a depthwise convolution result.

At 405, the vector unit results are outputted. For example, each vector unit outputs a vector unit result to an element of an output vector. In various embodiments, the output vector may be stored in a vector output unit such as output vector unit 151 of FIG. 1. In various embodiments, the vector unit results may be determined by accumulating multiple vector unit results over multiple iterations. In various embodiments, the vector unit results are outputted to an output vector unit for writing the results back to memory. In some embodiments, the vector unit results are portions of a depthwise convolution result.

At 407, a determination is made whether additional two-dimensional slices require processing. In the event additional two-dimensional slices remain to be processed, processing loops back to 401 to process the next slice. In the event no additional two-dimensional slices remain to be processed, processing ends.

Figure 5:
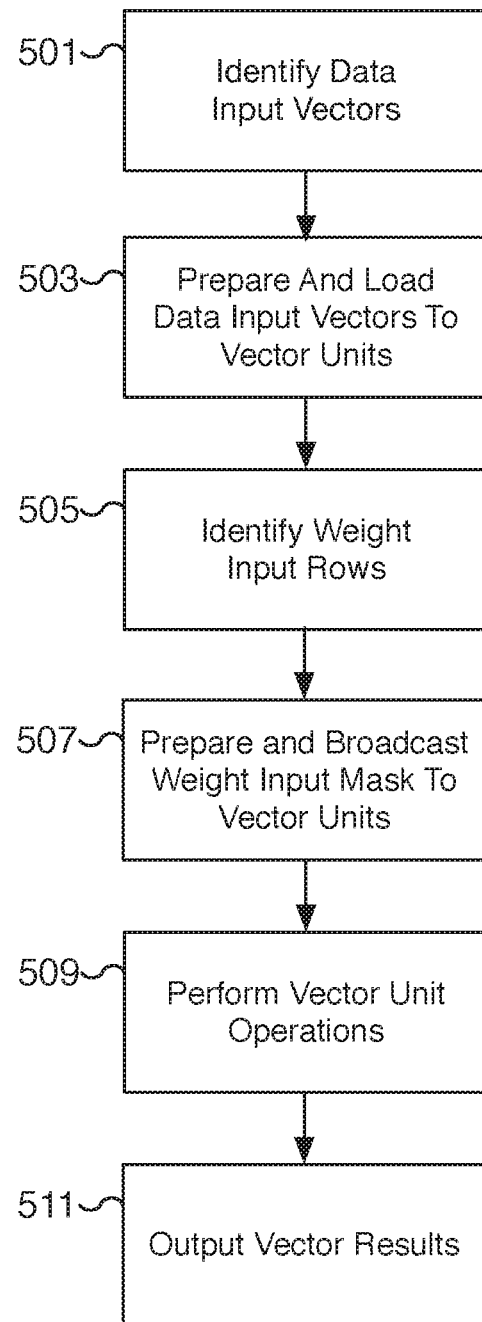
FIG. 5 is a flow chart illustrating an embodiment of a process for performing a two-dimensional convolution operation using a matrix processor unit and vector unit operations.

FIG. 5 is a flow chart illustrating an embodiment of a process for performing a two-dimensional convolution operation using a matrix processor unit and vector unit operations. For example, using the process of FIG. 5, input matrices are unrolled, linearized, and fed as input vectors to vector units of a matrix processor unit. Vector unit operations are performed to compute at least a partial result for the two-dimensional convolution operation. In various embodiments, a data input matrix and a weight input matrix are converted to input vectors. For example, a data slice may be identified from a data input matrix and converted to one or more data input vectors. In some embodiments, the process of FIG. 5 is performed at 403 and/or 405 of FIG. 4. In some embodiments, the process of FIG. 5 is performed using matrix processor unit 107 of FIG. 1 and/or matrix processor unit 201 of FIG. 2A.

At 501, data input vectors are identified. For example, one or more data input vectors are identified from a slice of a data input matrix. In some embodiments, a data input vector is identified and prepared for each vector unit of a matrix processor unit assigned to the convolution operation. The data input vectors may include overlapping elements and correspond to selected elements used for performing a matrix operation, such as a two-dimensional convolution operation.

At 503, data input vectors are prepared and loaded to vector units. For example, elements corresponding to a subset of a data matrix are identified. In some embodiments, the data matrix may be a two-dimensional matrix slice of a larger data matrix. In various embodiments, the identified elements are a subset of the data matrix and selected based on a corresponding weight matrix and in particular the dimensions of the weight matrix and the number of rows that will be unrolled. For example, in some embodiments, an entire weight matrix can be unrolled and linearized to fit into a vector unit operand. However, as the dimensions of the weight matrix increase relative to the size of operands supported by the vector unit, the weight matrix may be too large to be unrolled into a single input vector and instead the weight matrix and corresponding data matrix are unrolled across multiple iterations.

In various embodiments, a weight matrix is either fully unrolled in one iteration or can be partially unrolled across multiple iterations. Whether a matrix is fully or partially unrolled can depend on the dimensions of the matrix arguments, in particular the weight matrix, relative to the size of the supported input vectors for the matrix processor unit. For example, in a scenario with a 3×3 weight matrix and support for a 32-element input vector, all nine elements (corresponding to three rows) of the weight matrix can be unrolled into a single 32-element weight input vector. As part of preparing a corresponding data input vector, elements from columns corresponding to three rows of the data matrix are selected. The selected elements from three rows are unrolled into a one-dimensional vector. The number of columns utilized may be based on the size of the data input vector. In the example scenario with a 32-element data input vector, three rows are identified and 10 elements (corresponding to 10 columns) for each row are selected. A total of 30 elements are selected from three rows and ten columns. The remaining two locations in the data input vector for two elements are insufficient to fit an entire column from the identified three rows and instead are padded, for example, with two zero-value elements. In this manner, a 3×10 portion of a data matrix can be unrolled and linearized into a data input vector and padded with two zero-value elements. Once prepared, the data input vector is loaded to an appropriate vector unit of the matrix processor unit. In various embodiments, each vector unit of the matrix processor unit is loaded with a prepared data input vector. For example, each vector unit of the matrix processor unit can be loaded by selecting elements starting with a different row. In the event the matrix processor unit is processing multiple convolution operations in parallel, the vector units are assigned to vector unit groups. Each vector unit group is dedicated to processing a different convolution operation. The vector units for each group are loaded with the matrix elements corresponding to that group's assigned convolution operation.

In some embodiments, the initial number of columns to select from for preparing a data input vector is determined by dividing the size of the data input vector by the number of rows being unrolled. For example, in the event two, three, or four rows are being unrolled, a 32-element data input vector can be loaded with elements from sixteen, ten, or eight columns, respectively. Any unused elements of the data input vector can be filled with zero-value elements as padding. Once the number of columns is determined, each iteration can utilize the same number of columns. For example, a 7×7 matrix can be loaded into a 32-element data input vector over four iterations. For the first three iterations, two rows (i.e., rows 1-2, 3-4, and 5-6) are unrolled each iteration and the last row (i.e., row 7) is unrolled for the fourth iteration. Each iteration can select 16 elements from different columns for the corresponding selected rows. The last iteration has additional padding since only one row is being unrolled. In various embodiments, zero-value elements are used as padding elements. A padding element with a value of zero allows the vector unit to perform multiply and addition vector operations with no impact on a resulting vector sum or dot product result.

In various embodiments, once properly prepared using the appropriate format, a data input vector is loaded into a corresponding vector unit of the matrix processor unit. In some embodiments, a data input vector is prepared and loaded into each of the vector units of the matrix processor unit. For example, the data input vector prepared for each vector unit can correspond to a sub-matrix of a data input matrix with each sub-matrix starting at a different row of the data input matrix. For example, in the event the weight matrix is a fully unrolled 3×3 matrix, the first vector unit may correspond to a sub-matrix with elements from rows 1-3, the second vector unit may correspond to a sub-matrix with elements from rows 2-4, the third vector unit may correspond to a sub-matrix with elements from rows 3-5, and so forth. In an embodiment, with 32 vector units, the 32nd vector unit may correspond to a sub-matrix with elements from rows 32-34. In some embodiments, the vector units are assigned to particular vector unit groups and only sub-matrices from the assigned group's data matrix are loaded to the vector units of the group.

At 505, weight input rows are identified. For example, one or more rows from a weight input matrix are identified for performing vector unit operations. In some embodiments, a weight input matrix is fully unrolled and each row of the weight input matrix is identified for unrolling. In various embodiments, a weight input matrix may be too large for full unrolling and is only partially unrolled. Only the rows selected for unrolling are identified for further processing at 507. For example, a 3×3 weight matrix (with 9 elements) can be fully unrolled into a 32-element weight input vector so each row of the weight matrix is utilized. As another example, a 7×7 weight matrix (with 49 elements) cannot be fully unrolled into a 32-element weight input vector. Only the unrolled rows are identified for the current iteration. In various embodiments, successive iterations are used to identify the remaining rows.

At 507, a weight input mask is prepared and broadcasted to vector units. For example, elements corresponding to the weight input rows identified at 505 are prepared into a weight input mask. The weight input mask is linearized as a one-dimensional input vector for vector units of the matrix processor unit associated with a particular convolution operation. For example, the prepared weight input mask is broadcasted to each vector unit of a vector unit group assigned to a unique convolution operation. Other vector units not included in the vector unit group may receive a different weight input mask or may be unutilized. In various embodiments, the linearized weight elements are formatted with padding to align the start of each weight input row with an associated data input row prepared at 503. For example, using a 32-element vector and a 3×3 weight matrix with all rows identified at 505, all nine elements of the weight matrix are selected. The nine elements of the weight matrix are formatted into a weight input mask using an additional 23 padding elements. In some embodiments, 30 elements are used for the three rows of the selected 3×3 matrix. Each row includes three elements from a row followed by seven padding elements. The remaining elements of a data input vector not used for the rows of the selected 3×3 matrix, in this example, two elements, are filled with additional padding elements. In various embodiments, zero-value elements are used as padding elements. A padding element with a value of zero allows the vector unit to perform multiply and addition vector operations with no impact on a resulting vector sum.

In various embodiments, the formatted weight input mask is an input vector that is broadcasted to multiple vector units of a matrix processor unit. For example, a weight input vector is used to store the prepared weight input mask in a linearized one-dimensional vector format. The weight input mask is then broadcasted to each appropriate vector unit (e.g., each vector unit of a vector unit group) as an input vector operand. For example, a single weight input mask can be prepared and utilized by all the vector units of a matrix processor unit or all the vector units of a vector unit group of a matrix processor unit. In some embodiments, the row padding elements are utilized to allow the weight input mask to be shifted to realign the elements of the weight matrix with different columns of a data matrix as referenced in a data input vector. In some embodiments, the weight input mask is created by extracting weight elements from a combined weight vector. The combined weight vector may include weight elements from multiple weight matrices.

At 509, vector unit operations are performed. Utilizing the input vectors loaded from data input vectors and the broadcasted weight input mask, the corresponding vector units of a matrix processor unit perform vector unit operations. In some embodiments, the vector unit operations include vector multiply and addition operations. For example, each element from a data input vector is multiplied by its corresponding element from the weight input mask. The result is a vector of multiplication results. In some embodiments, the vector multiplication operation is performed by a vector multiply unit of a vector unit. Using the vector multiply result, a vector sum result is calculated by adding each of the elements from the vector of multiplication results. In some embodiments, the sum is determined using a vector adder unit of the vector unit. For example, a vector adder unit using an adder tree can compute the sum of the vector elements. In some embodiments, the matrix processor unit includes an accumulator for adding the vector adder result with previous vector adder results. For example, intermediate or partial results from each iteration can be accumulated to determine a running accumulated sum using an accumulator. The accumulated sum allows the vector sum result from one iteration (or pass) to be added into the result of a subsequent iteration (or pass). In various embodiments, the zero-padded elements prepared for the weight input mask (and/or data input vector) result in a zero multiplication result and have no impact on the vector addition result. In some embodiments, each vector unit of a matrix processor unit performs a dot product operation using its corresponding loaded data input vector and the broadcasted weight input mask. The dot product result may be accumulated with the results from previous iterations (or passes) and/or stored to be added to the results of future iterations.

At 511, vector results are outputted. For example, the vector result determined by performing vector unit operations at 509 is outputted from the matrix processor unit. In some embodiments, the vector results are outputted as an output vector result, for example, to an output vector unit such as output vector unit 151 of FIG. 1. The output vector unit may be used to write the output vector result to memory. In some embodiments, the results are outputted and used as an argument to a subsequent matrix operation.

Figure 6A:
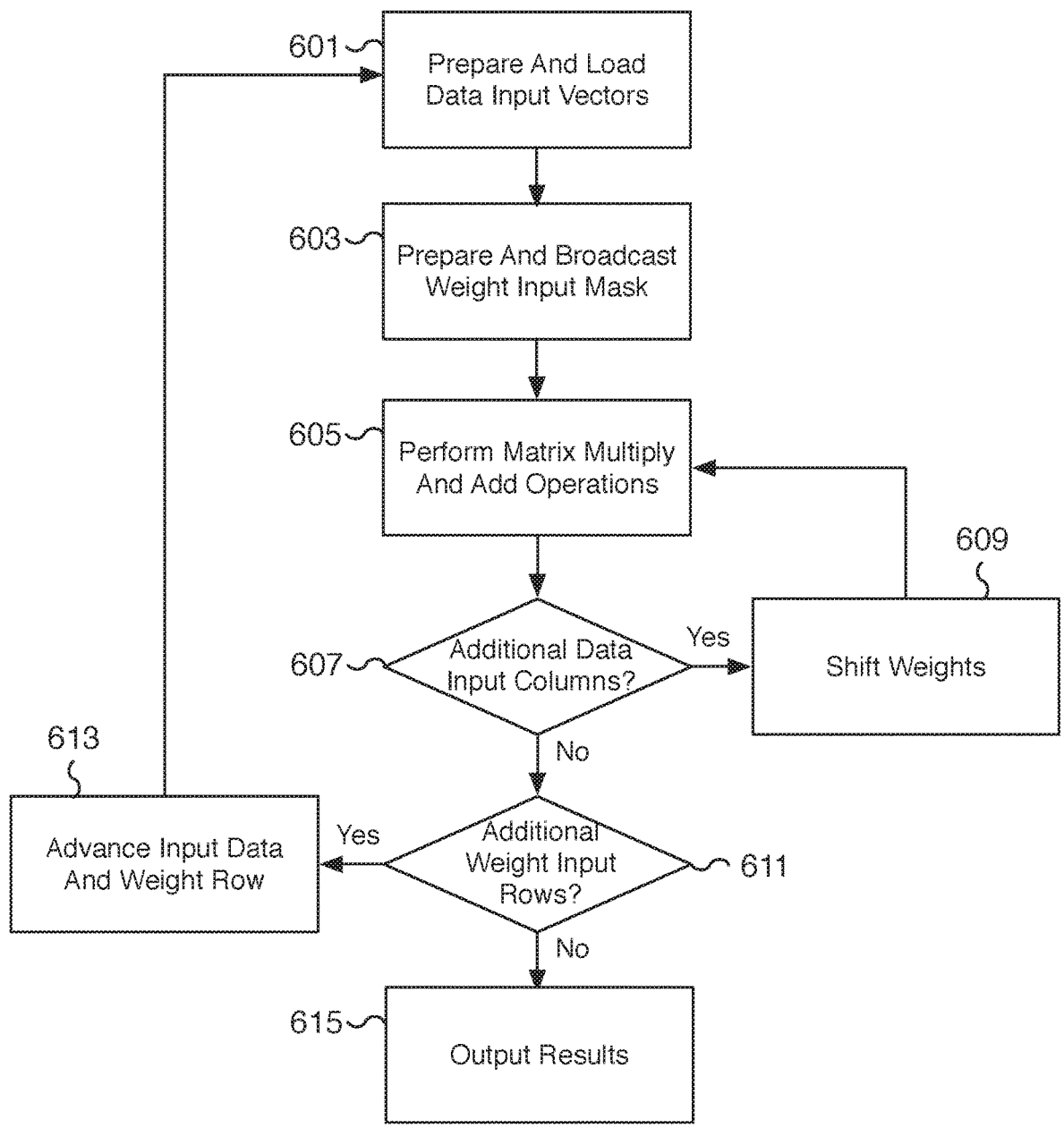
FIG. 6A is a flow chart illustrating an embodiment of a process for performing a two-dimensional convolution operation using a matrix processor unit and vector unit operations.

FIG. 6A is a flow chart illustrating an embodiment of a process for performing a two-dimensional convolution operation using a matrix processor unit and vector unit operations. For example, using a data input matrix and a data weight matrix, matrix multiply and add operations are performed to compute at least a partial result for the two-dimensional convolution operation. The input matrices are unrolled, linearized, and fed as input vectors to vector units of a matrix processor unit. In some embodiments, the vector units are selected based on a vector unit group associated with a particular convolution operation. Weight input matrices that do not fit the size of an input vector are partially unrolled across different iterations. To further increase the throughput and efficiency of the matrix computations, additional passes are performed by shifting the unrolled input weight mask to realign the elements of the weight mask with different elements (and corresponding columns) of loaded data input vectors. By reusing prepared data input vectors with realigned weight masks, the impact on performance related to data transfers, especially from loading elements from a data input matrix to the matrix processor unit, is significantly reduced. For example, multiple passes are performed on each data input vector for each iteration of an input weight mask by only modifying the input weight mask while keeping the loaded data input vectors unchanged. In some embodiments, the process of FIG. 6A is performed using the process of FIG. 5. For example, in some embodiments, the steps 605, 607, and/or 609 may be performed at 509 of FIG. 5. In some embodiments, the process of FIG. 6A is performed using matrix processor unit 107 of FIG. 1 and/or matrix processor unit 201 of FIG. 2A.

At 601, data input vectors are prepared and loaded into a matrix processor unit. In some embodiments, the data input vectors are prepared and loaded as described with respect to steps 501 and 503 of FIG. 5. For example, the data input vectors are loaded to be compatible with the corresponding rows of a weight input vector. In some embodiments, the data input vectors include padding elements such as zero-value elements to prevent loading partial columns of elements. As an example, using a 3×3 weight input matrix and a 32-element data input vector, a fully unrolled weight input matrix references three rows. Correspondingly, three rows of data elements are loaded into a data input vector. The number of three-row columns depends on the available number of elements from the data input vector. In the example, ten three-row columns are loaded for a total of 30 elements. The two remaining elements of the data input vector are unused and may be zeroed out with zero-value elements. The next data input vector can be loaded starting with the next corresponding row from the data matrix. In this manner, data input vectors from different (but possibly overlapping) slices of a data matrix are loaded into different vector units of the matrix processor unit. As another example, using a 7×7 weight input matrix and a 32-element data input vector, a partially unrolled weight input matrix references two rows for each of the first three iterations and a single final row for the fourth iteration. Correspondingly, two rows of data elements are loaded into a data input vector for the iterations with two weight rows and one row of data elements is loaded into a data input vector for the final iteration using the last (and seventh) weight row. The number of two-row columns depends on the available number of elements from the data input vector. In the example, sixteen two-row columns are loaded for a total of 32 elements for the first three iterations with no padding elements needed. For the fourth iteration, sixteen elements from a single row are loaded and the sixteen remaining elements of the data input vector are unused and may be zeroed out with zero-value elements. Similar to the 3×3 weight matrix example, within each iteration, the next data input vector can be loaded starting with the next corresponding row from the data matrix. In the 7×7 weight input matrix example, data input vectors from different (but possibly overlapping) slices of a data matrix are loaded into different vector units of the matrix processor unit either two rows (for the first three iterations) or one row (for the final and fourth iteration) at a time.

At 603, a weight input mask is prepared and broadcasted to one or more vector units of the matrix processor unit. In some embodiments, the weight input mask is prepared and broadcasted as described with respect to steps 505 and 507 of FIG. 5. For example, for a fully unrolled weight matrix, each row of the weight matrix is unrolled and linearized into an input vector. To improve the efficiency of the matrix operations, zero padded elements are used to evenly space out the rows of the weight matrix within the input vector. As described above, the zero-padded elements allow the weight input vector to act as a weight input mask. Shifting the weight elements realigns the weight input mask to associate the weight elements with different corresponding columns from the data matrix. In some scenarios, the weight mask is padded to account for incomplete corresponding data columns. Once loaded into a weight input vector, the weight input mask is broadcasted to one or more applicable vector units of the matrix processor unit. For example, the weight input mask can be broadcasted to every vector unit of a vector unit group corresponding to an assigned convolution operation for the matrix processor unit.

In some embodiments, a weight matrix is only partially unrolled. Over multiple iterations, all the rows of the weight matrix are unrolled. For a particular iteration, the selected rows are unrolled and padded with zero-value elements to create a partial weight mask associated with the selected rows. Subsequent iterations (or iterations performed in parallel) are used to unroll the remaining weight rows. For example, a 7×7 weight matrix (with 49 elements) cannot be fully unrolled into a 32-element weight input vector. Only the unrolled rows are identified for the current iteration. If at most two rows are unrolled, then four iterations are needed to fully unroll a 7×7 weight matrix. In some embodiments, different numbers of rows are selected for partial unrolling. For example, two, three, or more rows may be selected for unrolling as appropriate based on the weight matrix dimensions and the vector argument size of a vector unit.

At 605, matrix multiply and add operations are performed. In some embodiments, the matrix operations are described with respect to step 509 of FIG. 5. Utilizing the input vectors loaded from data input vectors and the broadcasted weight input mask, the corresponding vector units of a matrix processor unit perform vector unit operations including vector multiply and add operations. Each vector unit may perform a vector matrix multiply using the data input vector and the weight input mask. Unmasked elements result in multiplying the weight matrix elements against data matrix elements while masked out elements result in a zero value result. In various embodiments, the multiplication results are added using a vector adder to compute a resulting sum. For example, a 32-element vector unit receives two 32-element input vectors (a data input vector and a weight input mask) and performs a vector multiply to compute 32 multiplication results. A vector add operation is performed to add all 32 multiplication results to compute a single result sum. In some embodiments, the resulting sum is an intermediate result and is added to a previously computed result sum. For example, an accumulator may be used to store the resulting sum and on successive iterations the intermediate result is added to the currently computed result sum to keep a running sum across multiple iterations.

In some embodiments, each vector unit performs its vector operations in parallel. For example, a matrix processor unit with 32 vector units can compute 32 results corresponding to 32 result sums. In various embodiments, each vector unit of a matrix processor unit performs a dot product operation using its corresponding loaded data input vector and a broadcasted weight input mask. The dot product result may be accumulated with the results from previous iterations (or passes) and/or stored to be added to the results of future iterations. In some embodiments, each vector unit group independently determines the results associated with its assigned convolution operation in parallel with the other vector units of other vector unit groups.

At 607, a determination is made whether additional columns of the data input matrix remain to be processed. In the event additional columns of the data input matrix remain to be processed, processing proceeds to 609. In the event no additional columns of the data input matrix remain to be processed, processing proceeds to 611.

At 609, the weights corresponding to each weight input vector are shifted. For example, the elements of a vector input mask are shifted to realign the weight elements with different data elements from data input vectors. For example, existing data input vectors loaded at 601 are used in an additional pass with a new weight input vector. A new weight input vector is prepared by shifting the weight elements, for example, by shifting each weight element to the right by one element. The shift realigns the weight elements with data elements corresponding to the next column. For example, a weight input mask corresponding to a 3×3 weight matrix may be loaded into a vector unit along with a data input vector corresponding to a 3×10 slice of the data matrix. Shifting the weight elements effectively slides the weight input mask to associate the weight matrix with a different three columns from the 3×10 slice. With a 3×3 weight matrix, eight passes (corresponding to seven shifts) can be performed before reaching the end of the data slice. As another example, using a 7×7 weight matrix with two unrolled weight rows, each data input vector references 16 columns. Ten passes (corresponding to nine shifts) can be performed before reaching the end of the data slice. By spacing out the weight elements with padding elements in the weight input vector, the number of padding elements determines the maximum number of shifts (and passes) that can be performed with the loaded data input vectors.

In various embodiments, once a weight input vector is shifted, the newly prepared weight input vector is broadcasted to each applicable vector unit. Processing proceeds to 605 where matrix operations are performed using a realigned weight input mask and a previously loaded data input vector.

At 611, a determination is made whether additional rows of a weight input matrix remain to be processed. In the event additional rows of a weight input matrix remain to be processed, processing proceeds to 613. For example, partially unrolled matrices may have additional rows that need to be unrolled and processed. In contrast, a fully unrolled weight matrix will not have additional weight rows for processing. In the event no additional rows of a weight input matrix remain to be processed, processing proceeds to 615.

At 613, data input and weight rows are advanced. For example, for a partially unrolled weight (and corresponding data) matrix, the identified rows are advanced to select the next set of rows for unrolling. Both the weight and data matrices are advanced together in order to associate the correct weight and data elements together. Using a 7×7 weight matrix as an example and unrolling at most two rows each iteration, the first iteration selects rows 1 and 2. At 611, additional weight input rows remain to be processed so at step 613, the selected rows are advanced to select rows 3 and 4. A subsequent iteration selects rows 5 and 6. A final iteration selects row 7. Processing then proceeds to 601.

At 615, results are outputted. In some embodiments, the results are outputted as described with respect to step 511 of FIG. 5. For example, the vector result determined by performing the matrix multiply and add operations at 605 is outputted from the matrix processor unit. In various embodiments, the vector results are outputted as an output vector result, for example, to an output vector unit such as output vector unit 151 of FIG. 1. The output vector unit may be used to write the output vector result to memory. In some embodiments, the results are outputted and used as an argument to a subsequent matrix operation.

Figure 6B:
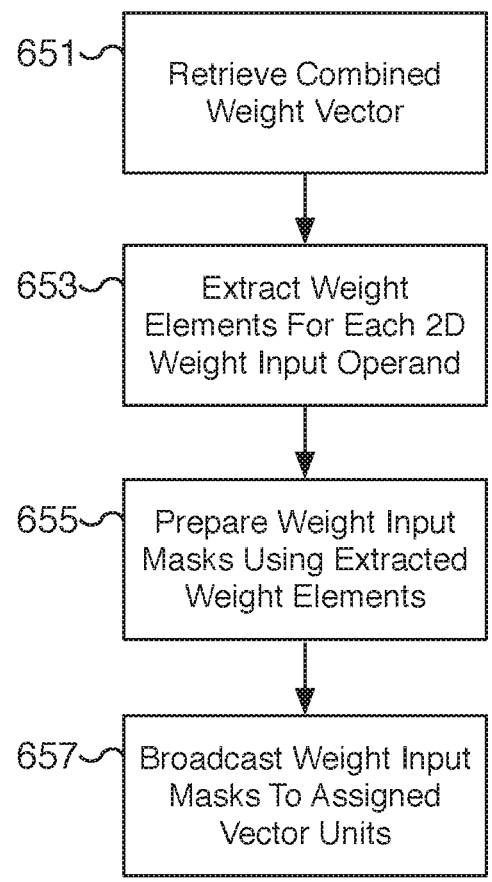
FIG. 6B is a flow chart illustrating an embodiment of a process for preparing weight input operands for performing two-dimensional convolution operations using a matrix processor unit and vector unit operations.

FIG. 6B is a flow chart illustrating an embodiment of a process for preparing weight input operands for performing two-dimensional convolution operations using a matrix processor unit and vector unit operations. For example, using a combined weight vector, two or more weight input masks are created and broadcasted to the appropriate vector units of a matrix processor unit. Each vector unit receives an appropriate weight input mask associated with its assigned convolution operation for computing at least a partial result of a two-dimensional convolution operation. The combined weight vector allows multiple weight matrices to be read from memory using a minimal number of memory reads. Once a combined weight vector is read from memory, the weight elements associated with a two-dimensional weight matrix are extracted and formatted into weight input masks that are broadcasted to the appropriate vector units. In some embodiments, the process of FIG. 6B is performed at 307 of FIG. 3, 403 of FIGS. 4, 505 and/or 507 of FIG. 5, and/or 603 of FIG. 6A. In some embodiments, the process of FIG. 6B is performed by an input vector unit such as weight input vector unit 105 of FIG. 1 and/or weight input vector unit 205 of FIG. 2A.

At 651, a combined weight vector is retrieved. For example, a combined weight vector is read from memory, such as memory 161 of FIG. 1, using a single read. By combining multiple weight matrices into a combined weight vector, a single read is sufficient to retrieve multiple weight matrices. For example, a 3×3 weight matrix can be represented by 9 weight elements. Each weight matrix is a two-dimensional input weight operand for a convolution operation. Using a 32-element read, up to three weight matrices can be read in a single combined weight vector by linearizing each weight matrix and concatenating the weight elements together into a single 27-element vector. The remaining five elements may be padding elements or additional metadata used to describe the combined weight vector. In some embodiments, only two weight matrices are combined into a single combined weight vector. For example, using a 3×3 weight matrix, 9 weight elements from each matrix are stored in a combined weight vector. In various embodiments, two or more combined weight vectors may be read over multiple reads to accommodate larger sized or a larger number of weight matrices.

At 653, weight elements for each two-dimensional weight input operand are extracted. Using the combined weight vector retrieved at 651, weight elements corresponding to a two-dimensional weight matrix are extracted in preparation for creating one or more weight input masks. Each set of extracted weight elements corresponds to a two-dimensional weight input operand for a matrix operation such as a convolution operation. In various embodiments, the elements are extracted for each weight matrix stored in the combined weight vector. For example, two or more weight matrices are extracted from the same combined weight vector to prepare different weight input masks corresponding to different weight input operands. In some embodiments, the elements are extracted and stored using a temporary memory location such as a register.

At 655, weight input masks using the extracted weight elements are prepared. For example, a separate weight input mask is prepared for each weight matrix using the extracted elements. In some embodiments, each weight input mask is prepared and stored in a memory location such as a register. The register used may be a register such as weight input vector registers 207 or 209 of FIG. 2A. In various embodiments, the weight input mask is an unrolled weight matrix with the appropriate number of zero padded elements used to evenly space out the rows of the weight matrix within the input vector. As described above, the zero-padded elements allow the input vector to act as a weight input mask. Shifting the weight elements realigns the weight input mask to associate the weight elements with different corresponding columns from a data matrix. In some scenarios, the weight mask is padded to account for incomplete corresponding data columns. For example, using a 32-element vector and a 3×3 weight matrix, at step 653, nine elements of a weight matrix are extracted. At step 655, the extracted elements are formatted into a weight input mask using an additional 23 padding elements. In some embodiments, 30 elements are used for the three rows of the selected 3×3 weight matrix. Each row includes three elements from a row followed by seven padding elements. The remaining two elements are filled with additional padding elements. In various embodiments, zero-value elements are used as padding elements. A padding element with a value of zero allows the vector unit to perform multiply and addition vector operations with no impact on a resulting vector sum.

At 657, weight input masks are broadcasted to assigned vector units. For example, each vector unit of a vector unit group receives its associated weight input mask. Different vector units corresponding to different vector unit groups receive the weight input mask associated with the convolution operation assigned to the group. In some embodiments, the vector unit groups are vector unit groups 211 and 221 of FIG. 2A and/or vector unit groups 253 and 255 of FIG. 2B. The weight input masks may be stored in corresponding weight input vector registers such as weight input vector registers 207 and 209 of FIG. 2A.

Figure 7A:
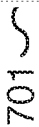

FIGS. 7A and 7B are diagrams illustrating example matrix operands for performing depthwise convolution. In FIG. 7A, weight matrix 701 represents an exemplar 3×3 matrix of weight elements. Other dimensions for a weight matrix may be appropriate as well, such as 1×1, 5×5, 7×7, 9×9, etc. In the example shown, the subscripts associated with each weight element use a row and column notation. For the first row of weight matrix 701, $W_{1,1}$ is the weight element located at column 1, $W_{1,2}$ is the weight element located at column 2, and $W_{1,3}$ is the weight element located at column 3. In FIG. 7B, data matrix 703 represents an exemplar data matrix of data elements. The dimensions of data matrix 703 are larger than weight matrix 701. In the example of FIG. 7B, only rows 1-4 and 32-34 of data matrix 703 are shown. The width of data matrix 703 can extend past 11 columns. Similarly, the height of data matrix 703 can extend past 34 rows (not shown). The height of data matrix 703 may also be smaller than the number of vector units. For example, a matrix processor unit may have 32 vector units but a data matrix (not shown) may only have 18 rows. In FIG. 7B, data matrix 703 is shown with 34 rows to make it compatible with 3×3 weight matrix 701 and a matrix processor unit with 32 vector units where each vector unit is utilized to solve matrix operations. In the event a data matrix has fewer rows than there are vector units (e.g., 18 rows for a 32 vector unit matrix processor unit), multiple matrix operations corresponding to different pairs of matrices can be processed in parallel. In some embodiments, weight matrix 701 and data matrix 703 are input matrices for performing convolution operations using the techniques described herein. In some embodiments, the convolution operations, such as a depthwise convolution, are performed on weight matrix 701 and data matrix 703 using matrix processor unit 107 of FIG. 1 and/or matrix processor unit 201 of FIG. 2A and/or the processes of FIGS. 3-6B. For example, the convolution operation instruction received at 301 of FIG. 3 may specify a weight matrix such as weight matrix 701 and a data matrix such as data matrix 703.

Figure 8A:
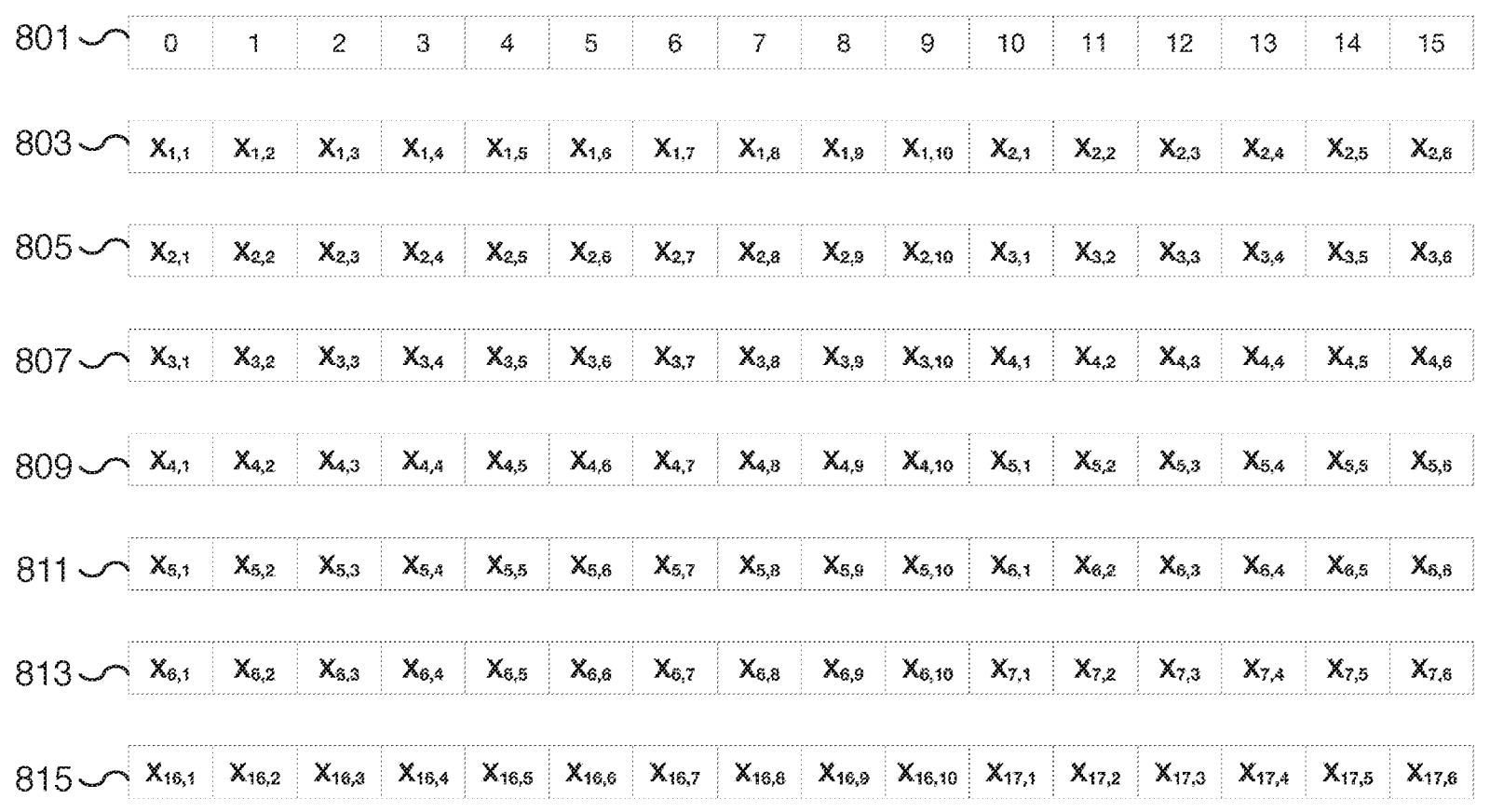

FIGS. 8A and 8B are diagrams illustrating an example of an unrolled data matrix for performing depthwise convolution. FIGS. 8A and 8B include index labels 801 and 802 that indicate the location of a data element in a 32-element data input vector. FIGS. 8A and 8B include seven example data input vectors 803/804, 805/806, 807/808, 809/810, 811/812, 813/814, and 815/816. The first half of each data input vector is shown in FIG. 8A and the corresponding second half of each input vector is shown in FIG. 8B. Due to the large size of the vectors, for ease of illustration, the data input vectors are illustrated as vector pairs and split across FIGS. 8A and 8B. For example, the seven 32-element data input vectors include 16-element vector pairs 803/804, 805/806, 807/808, 809/810, 811/812, 813/814, and 815/816.

In some embodiments, the data input vectors shown in FIGS. 8A and 8B are data input vectors unrolled from a sub-matrix of data matrix 703 of FIG. 7B or a data matrix with 18 rows. For example, data input vector 803/804 corresponds to elements from the first three rows of data matrix 703 of FIG. 7B unrolled into a 1-dimensional vector and includes data elements from rows 1-3 and columns 1-10 of data matrix 703. Similarly, referencing elements from columns 1-10 of data matrix 703 of FIG. 7B, data input vector 805/806 corresponds to elements from rows 2-4, data input vector 807/808 corresponds to elements from rows 3-5, data input vector 809/810 corresponds to elements from rows 4-6, data input vector 811/812 corresponds to elements from rows 5-7, data input vector 813/814 corresponds to elements from rows 6-8, and data input vector 815/816 corresponds to elements from rows 16-18. Data elements associated with different 3×10 slices of the data matrix are loaded into each of data input vectors 803/804, 805/806, 807/808, 809/810, 811/812, 813/814, and 815/816. Elements at locations 30 and 31 (the 31st and 32nd elements) of each of data input vectors 803/804, 805/806, 807/808, 809/810, 811/812, 813/814, and 815/816 are zero-value elements. In various embodiments, elements at locations 30 and 31 are padding elements.

In some embodiments, each of the data input vectors of FIGS. 8A and 8B are loaded into separate vector units of a matrix processor unit. For a matrix processor unit with 32 vector units, only 16 data input vectors are loaded and each may be prepared by starting with a different row. In the example shown, data input vectors 803/804, 805/806, 807/808, 809/810, 811/812, and 813/814 are loaded into the first six vector units and data input vector 815/816 is loaded into the 16th vector unit. Although not shown, vector units 7-15 are loaded with corresponding data input vectors. The vector units 1-16 may correspond to a vector unit group. The vector units 17-32 may correspond to a different vector unit group and may be configured to receive data input vectors corresponding to a different data matrix. In some embodiments, data input vectors 803/804, 805/806, 807/808, 809/810, 811/812, 813/814, and 815/816 are generated by and loaded into a matrix processor unit, such as matrix processor unit 107 of FIG. 1, by a data input vector unit such as data input vector unit 103 of FIG. 1. In some embodiments, the unrolling process to create data input vectors 803/804, 805/806, 807/808, 809/810, 811/812, 813/814, and 815/816 is performed at 305 of FIG. 3, at 401 and/or 403 of FIG. 4, at 501 and/or 503 of FIG. 5, and/or at 601 of FIG. 6A. In some embodiments, the data input vectors of FIGS. 8A and 8B represent a partial set of data input vectors prepared for one iteration of an unrolling process and are formatted to be aligned with a fully unrolled 3×3 weight matrix such as weight matrix 701 of FIG. 7A.

FIGS. 9A and 9B are diagrams illustrating an example of an unrolled weight matrix for performing depthwise convolution. FIGS. 9A and 9B include index labels 901 and 902 that indicate the location of a weight element in a 32-element weight input vector. FIGS. 9A and 9B include eight example weight input vectors 903/904, 905/906, 907/908, 909/910, 911/912, 913/914, 915/916, and 917/918. The first half of each weight input vector is shown in FIG. 9A and the corresponding second half of each input vector is shown in FIG. 9B. Due to the large size of the vectors, for ease of illustration, the weight input vectors are illustrated as vector pairs and split across FIGS. 9A and 9B. For example, the eight 32-element weight input vectors include 16-element vector pairs 903/904, 905/906, 907/908, 909/910, 911/912, 913/914, 915/916, and 917/918. The weight input vectors represent eight different weight input vectors that are broadcasted to the vector units of a matrix processor unit over eight passes. Examples of corresponding data input vectors are shown in FIGS. 8A and 8B and may remain unchanged for the entire eight passes as the weight input vectors change.

In some embodiments, the weight input vectors shown in FIGS. 9A and 9B are weight input vectors unrolled from weight matrix 701 of FIG. 7A. For example, each of weight input vectors 903/904, 905/906, 907/908, 909/910, 911/912, 913/914, 915/916, and 917/918 corresponds to elements from weight matrix 701 of FIG. 7A unrolled into and spaced out over a 1-dimensional vector. The weight elements and rows are prepared at different locations to align the weight input vector with different columns of a corresponding data input vector. Zero-value padded elements are included between the rows and at the end of the vectors at locations 30 and 31. For example, weight input vector 903/904 includes row 1 of weight matrix 701 of FIG. 7A at element locations 0-2, row 2 at element locations 10-12, and row 3 at element locations 20-22. Weight input vector 905/906 may be prepared by shifting the elements of weight input vector 903/904 to the right by one location. Similarly, weight input vectors 907/908, 909/910, 911/912, 913/914, 915/916, and 917/918 are created by shifting the elements of weight input vectors 905/906, 907/908, 909/910, 911/912, 913/914, and 915/916, respectively. In some embodiments, as the weight input vectors are shifted to the right, zero-value padding elements are introduced to the front of the weight input vectors.

In some embodiments, each of the weight input vectors of FIGS. 9A and 9B is broadcasted into appropriate vector units of a matrix processor unit at a different pass of the corresponding data input vectors. For a matrix processor unit with multiple vector units, each vector unit of a vector unit group is loaded with the same weight input vector for each pass. For example, weight input vector 903/904 is broadcasted to each assigned vector unit for pass one, weight input vector 905/906 is broadcasted to each assigned vector unit for pass two, weight input vector 907/908 is broadcasted to each assigned vector unit for pass three, and so forth, until weight input vector 917/918 is broadcasted to each assigned vector unit for the eighth pass. In various embodiments, the vector units assigned to a group each receive the same weight input vector, and each vector unit of the group is associated with the same convolution operation. Vector units of different groups receive weight input vectors corresponding to the appropriate weight matrix for the assigned convolution operation.

In some embodiments, weight input vectors 903/904, 905/906, 907/908, 909/910, 911/912, 913/914, 915/916, and 917/918 are generated and/or loaded into a matrix processor unit, such as matrix processor unit 107 of FIG. 1, by a weight input vector unit such as weight input vector unit 105 of FIG. 1. In some embodiments, the unrolling process to create weight input vectors 903/904, 905/906, 907/908, 909/910, 911/912, 913/914, 915/916, and 917/918 is performed at 307 of FIG. 3, at 401 and/or 403 of FIG. 4, at 505 and/or 507 of FIG. 5, and/or at 603, 607, and/or 609 of FIG. 6A. In some embodiments, the different weight input vectors of FIGS. 9A and 9B represent different weight input masks prepared for one iteration of an unrolling process that includes eight passes. Each of the weight input masks is a fully unrolled 3×3 weight matrix such as weight matrix 701 of FIG. 7A and is formatted to be aligned with different 3×3 slices of a data matrix, such as data matrix 703 of FIG. 7B. In various embodiments, different weight input masks can be broadcasted to different vector unit groups of a matrix processor unit.

FIGS. 10A and 10B are diagrams illustrating an example of vector computations for performing depthwise convolution. FIGS. 10A and 10B include index labels 1001 and 1002 that indicate the location of weight and data elements in 32-element weight input vector 1003/1004 and data input vector 1005/1006, respectively. In some embodiments, weight input vector 1003/1004 is weight input vector 903/904 of FIGS. 9A and 9B and data input vector 1005/1006 is data input vector 803/804 of FIGS. 8A and 8B. In some embodiments, weight input vector 1003/1004 and data input vector 1005/1006 are examples of two input vectors loaded into a vector unit for performing vector operations. In various embodiments, each of the vector units of a matrix processor unit is loaded with a corresponding pair of input vectors associated with its assigned convolution operation and vector unit group.

In some embodiments, cell 1011 illustrates the equivalent vector computations performed by a vector unit of a matrix processor unit on input vectors of weight input vector 1003/1004 and data input vector 1005/1006. The vector computation result shown in cell 1011 is the result determined by multiplying each element of weight input vector 1003/1004 against a corresponding element of data input vector 1005/1006. The 32-elements from weight input vector 1003/1004 are multiplied against 32 elements of data input vector 1005/1006 to determine 32 multiplication results. In the example shown, cell 1011 includes only nine multiplication terms instead of 32. The nine multiplication terms correspond to the nine weight elements from weight input vector 1003/1004 and their corresponding data elements from data input vector 1005/1006. The zero-value elements of weight input vector 1003/1004 function as a weight mask that results in reducing the number of multiplication terms to nine from a possible 32. In some embodiments, the multiplication is performed using a vector multiply unit such as vector multiply unit 271, 275, 291, or 295 of FIG. 2B. In some embodiments, the multiplication results are fed as a vector into a vector adder unit to compute the sum of the multiplication results. The vector sum may be performed using a vector adder unit such as vector adder unit 273, 277, 293, or 297 of FIG. 2B. In the example shown, the result of the vector operations performed is a single result sum. In some embodiments, the result sum is a partial or intermediate result sum and may be stored in an accumulator. In some embodiments, the result sum is a dot product computed using weight input vector 1003/1004 and data input vector 1005/1006. The result sum may be outputted as one element of a vector result and written to an output vector unit such as output vector unit 151 of FIG. 1. In some embodiments, the equivalent of the vector computation result shown in cell 1011 is performed using matrix processor unit 107 of FIG. 1 and/or the processes of FIGS. 3-6B. In some embodiments, the vector computations are performed at 309 of FIG. 3, at 403 of FIG. 4, at 509 of FIG. 5, and/or at 605 of FIG. 6B.

Figure 11A:
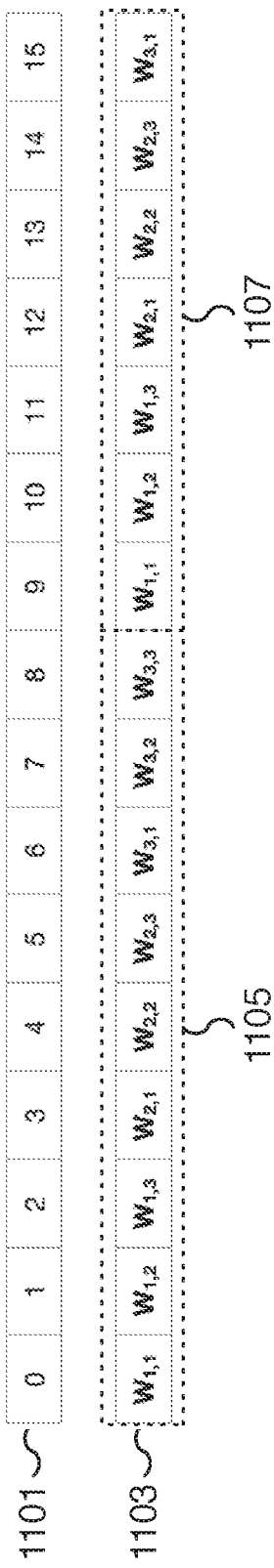
Figure 11B:
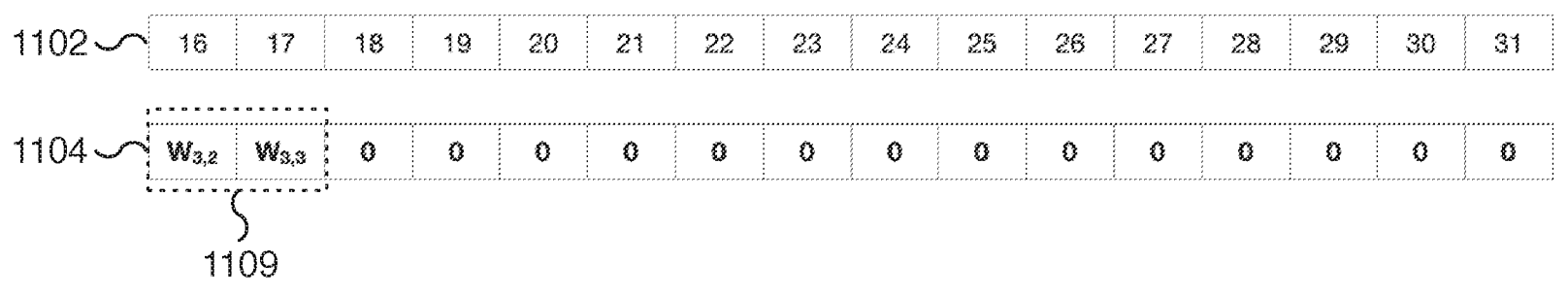

FIGS. 11A and 11B are diagrams illustrating an example of a combined weight vector used for performing multiple depthwise convolution operations in parallel. FIGS. 11A and 11B include index labels 1101 and 1102 that indicate the location of a weight element in a 32-element combined weight vector. FIGS. 11A and 11B include combined weight vector 1103/1104. The first half of combined weight vector 1103/1104 is shown in FIG. 9A and the corresponding second half of combined weight vector 1103/1104 is shown in FIG. 9B. Due to the large size of the vector, for ease of illustration, combined weight vector 1103/1104 is illustrated as a vector pair and split across FIGS. 11A and 11B. Combined weight vector 1103/1104 stores two weight matrices, each corresponding to a different convolution operation. The first weight matrix includes the nine weight elements from elements group 1105. The second weight matrix is split across FIGS. 11A and 11B and includes the nine weight elements from elements groups 1107 and 1109. The represented weight matrices are each two-dimensional 3×3 weight matrices. In some embodiments, the weight matrices are a two-dimensional weight matrix such as weight matrix 701 of FIG. 7A.

In the example shown, the two weight matrices represented by the nine weight elements from elements group 1105 and the nine weight elements from elements groups 1107 and 1109 are two different weight matrices and each corresponds to a different convolution operation. The subscripts associated with each weight element use a row and column notation. For the first row, $W_{1,1}$ is the weight element located at column 1, $W_{1,2}$ is the weight element located at column 2, and $W_{1,3}$ is the weight element located at column 3. In the example shown, weight elements from elements group 1105 represent a linearized two-dimensional matrix with three rows and three columns. Similarly, the weight elements from elements groups 1107 and 1109 represent a different linearized two-dimensional matrix with three rows and three columns. For each weight matrix, the corresponding elements of the linearized two-dimensional matrix can be extracted and used to create a weight input mask. In some embodiments, the locations 18-31 of combined weight vector 1103/1104 are unused. In some embodiments, the extra locations are filled with padding elements or additional metadata used to describe the combined weight vector. In various embodiments, the specific locations and offsets for each weight matrix stored in combined weight vector 1103/1104 can vary as appropriate. In some embodiments, an additional three or more weight matrices may be stored in a combined weight vector. For example, a 32-element combined weight vector can store three 3×3 matrices using 27 weight elements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a data input vector unit configured to concurrently receive elements of a plurality of different rows of a first data matrix and a second data matrix;
a weight input vector unit configured to:
receive a combined weight vector, wherein the combined weight vector includes weight elements of a first weight matrix and weight elements of a second weight matrix, and the first weight matrix and the second weight matrix are different matrices for different corresponding data matrices despite being combined in the combined weight vector;
extract for the first data matrix the weight elements of the first weight matrix from the combined weight vector;
extract for the second data matrix the weight elements of the second weight matrix from the combined weight vector; and
at least in part concurrently provide the extracted weight elements of the first weight matrix to a first group of one or more calculation units for the first data matrix and provide the extracted weight elements of the second weight matrix to a second group of one or more calculation units for the second data matrix; and a plurality of calculation units of a matrix processor unit including the first group of one or more calculation units and the second group of one or more calculation units, wherein each calculation unit of the first group of calculation units is configured to multiply provided elements of the first data matrix from the data input vector unit with provided corresponding elements of the first weight matrix from the weight input vector unit and sum together multiplication results of the corresponding calculation unit to at least in part determine a corresponding element in a first convolution result matrix, and wherein each calculation unit of the second group of calculation units is configured to multiply provided elements of the second data matrix from the data input vector unit with provided corresponding elements of the second weight matrix from the weight input vector unit and sum together multiplication results of the corresponding calculation unit to at least in part determine a corresponding element in a second convolution result matrix.

2. The system of claim 1, wherein each of the plurality of calculation units is a different vector calculation unit.

3. The system of claim 2, wherein each vector calculation unit includes a vector multiply unit and a vector adder unit.

4. The system of claim 3, wherein the vector adder unit includes an adder tree.

5. The system of claim 1, wherein the matrix processor unit includes one or more vector accumulators.

6. The system of claim 5, wherein at least one of the one or more vector accumulators is configured to store a vector of intermediate results corresponding to partial results of convoluting the first weight matrix with the first data matrix.

7. The system of claim 1, wherein the first weight matrix and the second weight matrix are different machine learning weight matrices and the first and second data matrices store data for machine learning.

8. The system of claim 1, wherein the first and second data matrices correspond to different channels of a three-dimensional machine learning data matrix.

9. The system of claim 1, wherein the first and second weight matrices are each a 3×3 matrix.

10. The system of claim 1, wherein the weight input vector unit includes a first register for storing extracted weight elements of the first weight matrix and a second register for storing extracted weight elements of the second weight matrix, and wherein the first register and second register are different.

11. The system of claim 10, wherein the weight input vector unit includes a shifting circuit configured to shift each of the extracted weight elements within the first register and each of the extracted weight elements within the second register.

12. The system of claim 1, wherein the weight input vector unit is further configured to format the extracted weight elements of the first weight matrix into a first weight input mask and to format the extracted weight elements of the second weight matrix into a second weight input mask.

13. The system of claim 12, wherein the first weight input mask is stored in a first register of the weight input vector unit and the second weight input mask is stored in a second register of the weight input vector unit, and wherein the first register and second register are different.

14. The system of claim 12, wherein each of the first and second weight input masks includes zero-value padding elements.

15. The system of claim 1, wherein the combined weight vector is a 32-byte vector stored in a memory unit and includes zero-value padding elements.

16. The system of claim 1, wherein the combined weight vector includes weight elements of three or more different weight matrices.

17. A method, comprising:
receiving at a processing element an instruction specifying a first data matrix, a second data matrix, and a combined weight vector, wherein the first data matrix is associated with a first convolution operation and the second data matrix is associated with a second convolution operation, and wherein the combined weight vector includes weight elements of a first weight matrix associated with the first convolution operation and weight elements of a second weight matrix associated with the second convolution operation, and the first weight matrix and the second weight matrix are different matrices for different corresponding data matrices despite being combined in the combined weight vector;
extracting for the first data matrix the weight elements of the first weight matrix from the combined weight vector;
extracting for the second data matrix the weight elements of the second weight matrix from the combined weight vector;
assigning a plurality of calculation units of a matrix processor unit to a first group of one or more calculation units and a different plurality of calculation units to a second group of one or more calculation units;
creating a first weight input mask associated with the first convolution operation from the combined weight vector; and
creating a second weight input mask associated with the second convolution operation from the combined weight vector.

18. The method of claim 17, further comprising:
broadcasting the first weight input mask to each calculation unit of the first group of one or more calculation units;
broadcasting the first weight input mask to each calculation unit of the second group of one or more calculation units;
providing each calculation unit of the first group of one or more calculation units elements of a plurality of different rows of the first data matrix;
providing each calculation unit of the second group of one or more calculation units elements of a plurality of different rows of the second data matrix; and
at least in part concurrently performing vector operations using the first and second groups of one or more calculation units using a broadcasted first or second weight input and provided data elements from the first or second data matrix.

19. A method, comprising:
concurrently receiving at a data input vector unit elements of a plurality of different rows of a first data matrix and a second data matrix;
receiving at a weight input vector unit a combined weight vector, wherein the combined weight vector includes weight elements of a first weight matrix and weight elements of a second weight matrix, and the first weight matrix and the second weight matrix are different matrices for different corresponding data matrices despite being combined in the combined weight vector;

extracting for the first data matrix the weight elements of the first weight matrix from the combined weight vector;

extracting for the second data matrix the weight elements of the second weight matrix from the combined weight vector;

at least in part concurrently providing the extracted weight elements of the first weight matrix to a first group of one or more calculation units and providing the extracted weight elements of the second weight matrix to a second group of one or more calculation units; and at least in part concurrently providing the elements of the plurality of the different rows of the first data matrix first to the first group of the one or more calculation units for the first data matrix and providing the elements of the plurality of the different rows of the second data matrix first to the second group of the one or more calculation units for the second data matrix.

20. The method of claim 19, further comprising:

at least in part concurrently multiplying the provided elements of the first data matrix from the data input vector unit with the provided corresponding elements of the first weight matrix from the weight input vector unit and multiplying the provided elements of the second data matrix from the data input vector unit with the provided corresponding elements of the second weight matrix from the weight input vector unit; and at least in part concurrently summing together multiplication results to at least in part determine a corresponding element in a first convolution result matrix and summing together multiplication results to at least in part determine a corresponding element in a second convolution result matrix.

\* \* \* \* \*